US012695218B2

(12) United States Patent
Miyamura et al.

(10) Patent No.: US 12,695,218 B2
(45) Date of Patent: Jul. 28, 2026

(54) COMBINATION TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Hideto Nakamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 349 days.

(21) Appl. No.: 18/294,292

(22) PCT Filed: Jul. 20, 2022

(86) PCT No.: PCT/JP2022/028150

§ 371 (c)(1),
(2) Date: Feb. 1, 2024

(87) PCT Pub. No.: WO2023/017715

PCT Pub. Date: Feb. 16, 2023

(65) Prior Publication Data

US 2024/0347937 A1 Oct. 17, 2024

(30) Foreign Application Priority Data

Aug. 10, 2021 (JP) ................................ 2021-130534

(51) Int. Cl.
*H01R 11/01* (2006.01)
*H01R 4/30* (2006.01)
(Continued)

(52) U.S. Cl.
CPC ............ *H01R 11/01* (2013.01); *H01R 4/304* (2013.01); *H01R 4/34* (2013.01); *H01R 11/12* (2013.01); *H01R 11/32* (2013.01)

(58) Field of Classification Search
None
See application file for complete search history.

(56) References Cited

U.S. PATENT DOCUMENTS 5,558,531 A * 9/1996 Ikeda .................... H01R 13/28 439/907
5,759,055 A * 6/1998 Colantuano ............ H01R 13/28 439/907
(Continued)

FOREIGN PATENT DOCUMENTS

CN 101946369 A * 1/2011 ............. H01R 4/305
DE 102005061221 A1 * 6/2007 ............... H01R 4/34
(Continued)

OTHER PUBLICATIONS

International Search Report issued on Sep. 13, 2022 for WO 2023/017715 A1 (4 pages).

*Primary Examiner* — Tho D Ta
(74) *Attorney, Agent, or Firm* — Venjuris, P.C.

(57) ABSTRACT

Terminals can be fixed by only one type of bolt even if the number of the terminals to be stacked is different. A combination terminal (1) is provided with a first terminal (10B) to be fixed to a fixed member (40) using a bolt (30) and a second terminal (10C) to be assembled with the first terminal (10B). The first terminal (10B) and the second terminal (10C) include locking portions (13) and resilient locking portions (17) for locking the first terminal (10B) and the
(Continued)

second terminal (10C) in an assembled state by being locked to each other. The second terminal (10C) includes a through hole (18C), into which a head portion (31) of the bolt (30) enters in the assembled state of the first terminal (10B) and second terminal (10C).

4 Claims, 17 Drawing Sheets

(51) Int. Cl.

| | |
|---|---|
| ***H01R 4/34*** | (2006.01) |
| ***H01R 11/12*** | (2006.01) |
| ***H01R 11/32*** | (2006.01) |

(56) References Cited

U.S. PATENT DOCUMENTS

| | | | | |
|---|---|---|---|---|
| 5,934,923 | A * | 8/1999 | Matsuoka | H01R 11/12 439/287 |
| 6,530,795 | B2 * | 3/2003 | Maeda | H01R 13/28 439/907 |
| 6,969,276 | B2 * | 11/2005 | Ono | H01R 11/26 439/907 |
| 7,867,044 | B2 * | 1/2011 | Lee | H01R 11/12 439/108 |
| 8,105,121 | B2 * | 1/2012 | Miyamoto | H01R 4/646 439/883 |
| 9,300,093 | B2 * | 3/2016 | Omori | H01R 13/648 |
| 9,859,629 | B2 * | 1/2018 | Krebs | H01R 4/34 |
| 2017/0310021 | A1 * | 10/2017 | Tsuchiya | H01R 33/97 |
| 2018/0241138 | A1 | 8/2018 | Kitagawa et al. | |

FOREIGN PATENT DOCUMENTS

| | | | | |
|---|---|---|---|---|
| DE | 102017211459 | A1 | 1/2018 | |
| FR | 3028675 | A1 * | 5/2016 | H01R 43/16 |
| JP | 2004-207209 | A | 7/2004 | |
| JP | 2009-032456 | A | 2/2009 | |
| JP | 2013-025922 | A | 2/2013 | |
| JP | 2016-081673 | A | 5/2016 | |
| JP | 2017-103188 | A | 6/2017 | |
| JP | 2018-170245 | A | 11/2018 | |
| KR | 101089834 | B1 * | 12/2011 | H01R 4/38 |
| KR | 200477645 | Y1 * | 7/2015 | H01R 4/30 |

* cited by examiner

COMBINATION TERMINAL

CROSS REFERENCE TO RELATED APPLICATIONS

This application is a national phase of PCT application No. PCT/JP2022/028150, filed on 20 Jul. 2022, which claims priority from Japanese patent application No. 2021-130534, filed on 10 Aug. 2021, all of which are incorporated herein by reference.

TECHNICAL FIELD

The present disclosure relates to a combination terminal.

BACKGROUND

A terminal coupling structure disclosed in Patent Document 1 is provided with a plurality of flat plate-like terminals each connected to a wire and provided with a through hole and a screw for fixing the plurality of terminals to a fixing portion. The screw is fixed to the fixing portion while being passed through the respective through holes of the plurality of stacked terminals.

PRIOR ART DOCUMENT

Patent Document

Patent Document 1: JP 2016-081673 A

SUMMARY OF THE INVENTION

Problems to be Solved

However, in the configuration of Patent Document 1, a stacking height of the terminals changes if the number of the terminals is changed. Thus, a screw having a length corresponding to the number of the terminals needs to be selected. It is separately necessary to control a torque in fixing the screw. Also in a step of changing the number of the terminals, a step of removing the screw and a step of tightening the screw again after the terminals are stacked are necessary, which leads to an increase in the number of steps.

The present disclosure was completed on the basis of the above situation and aims to enable terminals to be fixed by only one type of bolt even if the number of the terminals to be stacked is different.

Means to Solve the Problem

The present disclosure is directed to a combination terminal with a first terminal to be fixed to a fixed member using a bolt and a second terminal to be assembled with the first terminal, the first terminal and the second terminal including lock portions for locking the first terminal and the second terminal in an assembled state by being locked to each other, and the second terminal including a cut portion, a head portion of the bolt entering the cut portion in the assembled state of the first terminal and the second terminal.

Effect of the Invention

According to the present disclosure, even if the number of terminals to be stacked is different, the terminals can be fixed by only one type of bolt.

DETAILED DESCRIPTION TO EXECUTE THE INVENTION

Description of Embodiments of Present Disclosure

Figure 1:
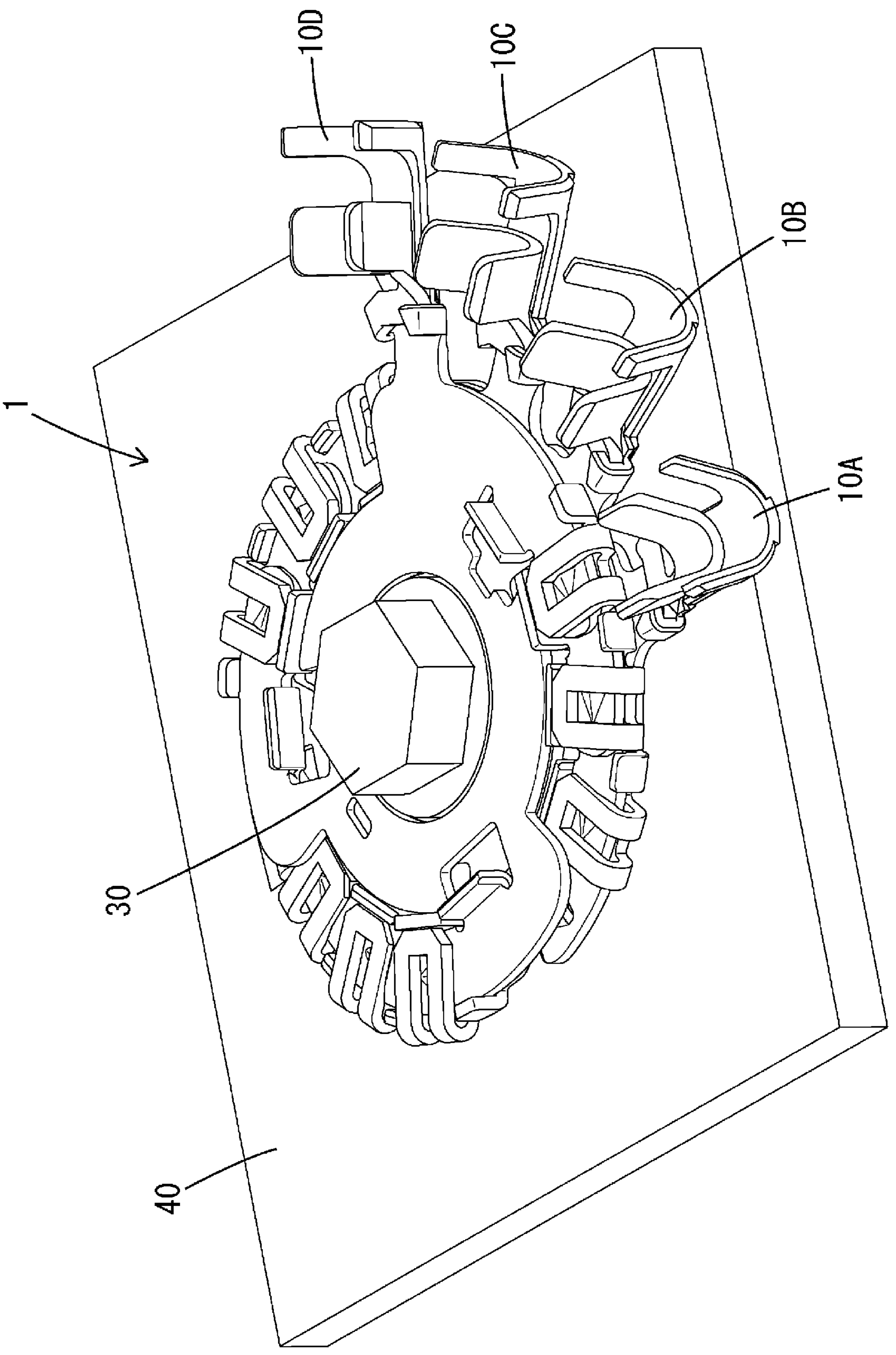
FIG. 1 is a perspective view showing a state where a combination terminal according to a first embodiment is fixed to a fixed member.

First, embodiments of the present disclosure are listed and described.

(1) The combination terminal of the present disclosure is provided with a first terminal to be fixed to a fixed member using a bolt and a second terminal to be assembled with the first terminal, the first terminal and the second terminal including lock portions for locking the first terminal and the second terminal in an assembled state by being locked to each other, and the second terminal including a cut portion, a head portion of the bolt entering the cut portion in the assembled state of the first terminal and the second terminal.

According to the configuration of the present disclosure, the head portion of the bolt enters the cut portion of the second terminal in a state where the first terminal and the second terminal are locked in the assembled state by locking the lock portions to each other. Thus, the first terminal can be fixed to the fixed member without the second terminal contacting the bolt. Therefore, even if the second terminal is assembled with the first terminal, the terminals can be fixed to the fixed member by only one type of bolt.

(2) Preferably, the lock portions are locked to each other by relatively rotating the first terminal and the second terminal, the second terminal includes a second base plate portion provided with the cut portion, and an annular second planar portion is provided around the cut portion in the second base plate portion.

According to this configuration, in fixing the first terminal to the fixed member using the bolt in the assembled state of the first terminal and the second terminal, the posture of a jig such as a wrench can be stabilized since the second planar portion is present around the cut portion in the second terminal.

(3) Preferably, the first terminal includes a first base plate portion, the second terminal includes a second base plate portion provided with the cut portion, the first terminal and the second terminal are assembled with the first base plate portion and the second base plate portion stacked, the lock portions are locked to each other by relatively displacing the first terminal and the second terminal in a direction intersecting a stacking direction, and the first terminal includes a first planar portion to be exposed in the cut portion in the assembled state of the first terminal and the second terminal.

According to this configuration, in fixing the first terminal and the second terminal to the fixed member using the bolt in the assembled state of these terminals, the posture of a jig such as a wrench can be stabilized since the first planar portion to be exposed in the cut portion of the second terminal is present in the first terminal.

(4) Preferably, a rotation direction of the second terminal with respect to the first terminal to lock the lock portions to each other is the same direction as a tightening direction of the bolt with respect to the first terminal.

According to this configuration, the bolt is hardly loosened in rotating the second terminal with respect to the first terminal.

DETAILS OF EMBODIMENTS OF PRESENT DISCLOSURE

First Embodiment

Figure 2:
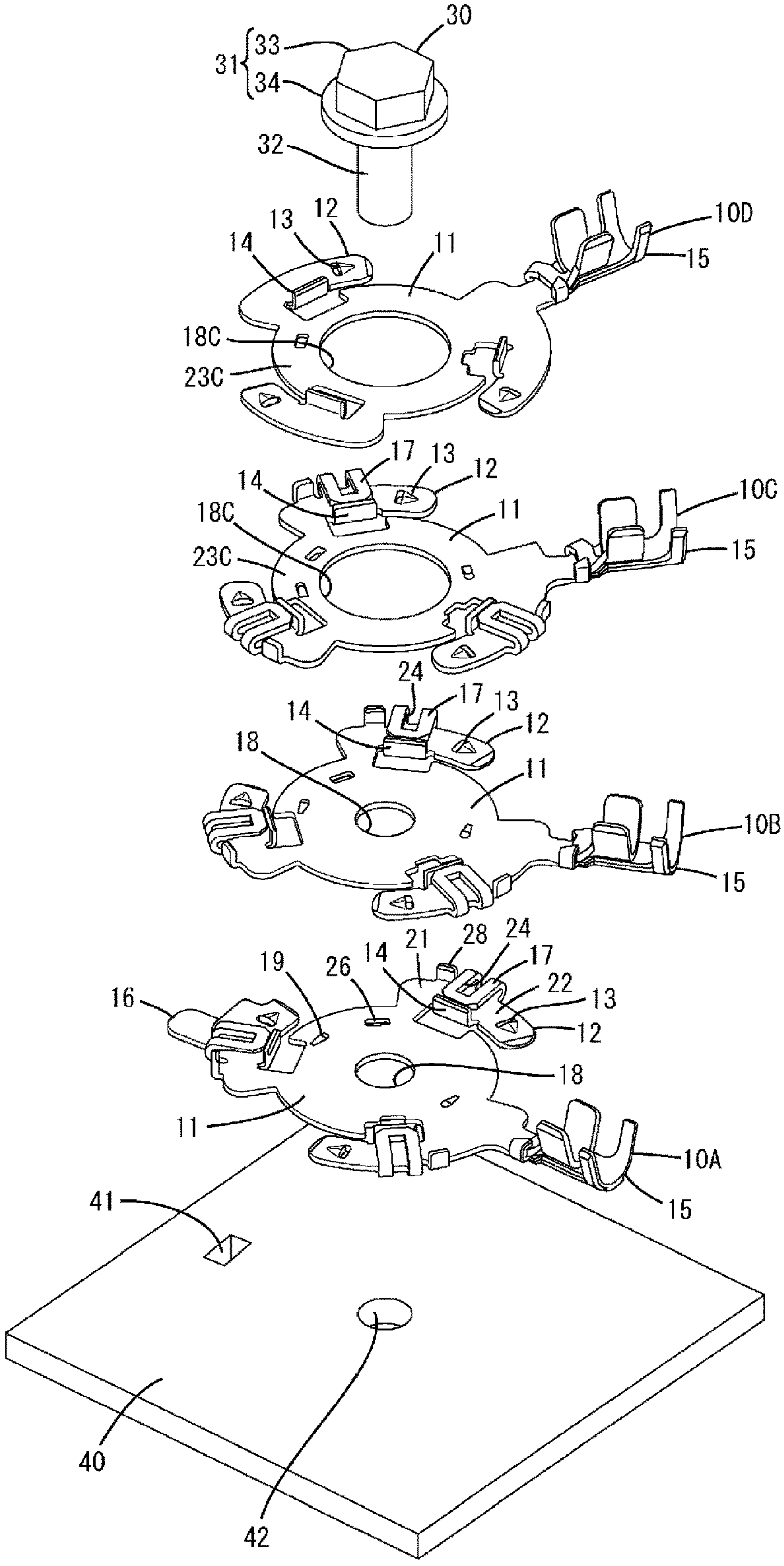
FIG. 2 is an exploded perspective view of FIG. 1.
Figure 3:
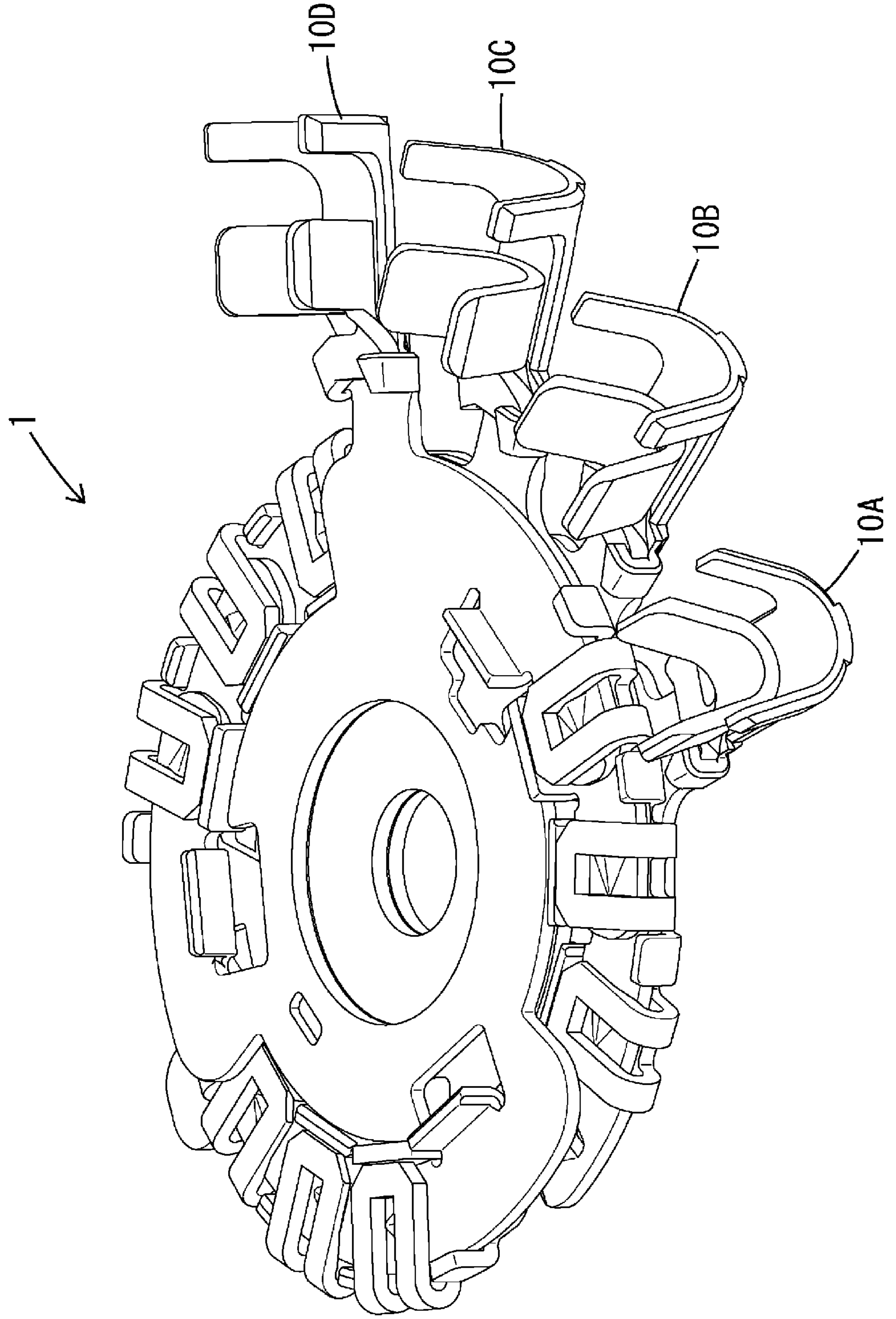
FIG. 3 is a perspective view of the combination terminal formed by assembling four terminals.

A combination terminal 1 according to a first embodiment of the present disclosure is provided with a plurality of terminals 10A, 10B, 10C and 10D as shown in FIGS. 1 to 3. The respective terminals 10A, 10B, 10C and 10D are combined with plate surfaces thereof facing each other. Each of the terminals 10A, 10B, 10C and 10D is connected to an end part of an unillustrated wire. For example, the respective wires are connected to a ground portion such as a body of a vehicle and grounded by the combination terminal 1. Note that, in the following description, a vertical direction is based on FIGS. 1 to 3. The vertical direction is a facing direction of the plate surfaces of the respective terminals 10A, 10B, 10C and 10D and also a stacking direction of the respective terminals 10A, 10B, 10C and 10D.

<Configuration of Combination Terminal>

Each of the terminals 10A, 10B, 10C and 10D is integrally formed, such as by bending an electrically conductive metal plate material. In the case of the first embodiment, the terminals 10A, 10B, 10C and 10D are constituted by four types of terminals having different shapes. The terminal 10B corresponds to a “first terminal” of the present disclosure. The terminal 10C corresponds to a “second terminal” of the present disclosure. In FIGS. 1 and 3, the terminals 10A, 10B, 10C and 10D are stacked in this order.

As shown in FIG. 1, the combination terminal 1 is fastened to a fixed member 40 using a bolt 30. The fixed member 40 is constituted as the body of the vehicle or the like. The bolt 30 is fixed to the fixed member 40 through the respective terminals 10A, 10B, 10C and 10D. As shown in FIG. 2, the bolt 30 includes a head portion 31 and a shaft portion 32. The head portion 31 includes a screw head 33 and a washer 34. The washer 34 has a circular ring shape and is used by inserting the shaft portion 32 therethrough.

As shown in FIG. 2, the terminal 10A includes a base plate portion 11, guided portions 12, locking portions 13, guide portions 14, a crimping portion 15, a hooking portion 16 and resilient locking portions 17. The base plate portion 11 is in the form of a flat plate circular in a plan view.

A circular through hole 18 is formed to penetrate through a central part of the base plate portion 11. The shaft portion 32 of the bolt 30 is inserted through the through hole 18 from above the combination terminal 1. The base plate portion 11 is formed with a pair of contact point receiving portions 19 at positions on both radial sides across the through hole 18. Each contact point receiving portion 19 is in the form of a slit open in the base plate portion 11. A pair of contact point portions 26 are formed at positions on both radial sides across the through hole 18 in the base plate portion 11. The contact point portions 26 and the contact point receiving portions 19 are arranged at intervals in a circumferential direction in the base plate portion 11. The contact point portion 26 is in the form of a rib and formed by press-working to bulge upwardly of the base plate portion 11.

The guided portion 12 is plate-like and a plurality of the guided portions 12 project from the outer peripheral edge of the base plate portion 11. Plate surfaces of each guided portion 12 are continuous and coplanar with those of the base plate portion 11. Specifically, each guided portion 12 includes a root portion 21 projecting radially outward from one of three positions on the outer peripheral edge of the base plate portion 11 and a body portion 22 extending in a curved manner along the circumferential direction of the outer periphery of the base plate portion 11 from the root portion 21. The root portions 21 of the respective guided portions 12 are arranged not at equal intervals of 120°, but at unequal intervals on the outer peripheral edge of the base plate portion 11. Each guided portion 12 is provided with an outer peripheral guide portion 28. The outer peripheral guide portion 28 has a rectangular shape in a side view, rises from a position on the side of the root portion 21 on the outer peripheral edge of the body portion 22 and extends shorter than the guide portion 14 to be described later in the circumferential direction or a tangential direction.

The locking portion 13 corresponds to a “lock portion” of the present disclosure. The locking portion 13 is provided on each guided portion 12. The locking portion 13 is in the form of a claw triangular in a plan view and formed by press-working to bulge upward via a cut along a radial direction at a position near a tip part of the body portion 22.

The resilient locking portions 17 correspond to the “lock portion” of the present disclosure. The resilient locking portions 17 of the terminal 10A and locking portions 13 of the terminal 10B to be described later are locked to each other, whereby the terminals 10A, 10B are locked in an assembled state. The resilient locking portion 17 is provided on each guided portion 12. The resilient locking portion 17 is formed by folding a U-shaped looped part projecting radially outward from an outer peripheral edge, which is a distant side edge from the base plate portion 11 out of both side edges in a plate width direction of the body portion 22, radially inwardly. A locking hole 24 long along a projection direction is formed to penetrate inside the resilient locking portion 17.

The guide portion 14 is provided on each guided portion 12. As shown in FIG. 2, the guide portion 14 has a rectangular shape in a side view, rises from an inner peripheral edge, which is a side edge closer to the base plate portion 11 out of the both side edges in the plate width direction of the body portion 22, and is formed to extend in the circumferential direction or tangential direction along the inner peripheral edge of the body portion 22. The guide portion 14 is provided at a position near the root portion 21 on the side of the guided portion 12 near the base plate portion 11. When the terminal 10A is in a developed state before being bent, a rectangular tongue piece is bent and raised at a right angle toward the body portion 22, whereby the guide portion 14 is formed.

The crimping portion 15 projects radially outward from the root portion 21 of one guided portion 12. The root portion 21 (root portion 21 on a frontal side of FIG. 2) continuous with the crimping portion 15 is formed to be wider in the circumferential direction than the other root portions 21. The crimping portion 15 is crimped and connected to the end part of the unillustrated wire.

The hooking portion 16 is in the form of a plate piece and projects radially outward from one guided portion 12 located on a side opposite to a side where the crimping portion 15 is formed in the circumferential direction. The hooking portion 16 includes a step part bent downward at a halfway position. The hooking portion 16 is hooked to the fixed member 40 and functions to restrict the rotation of the combination terminal 1.

As shown in FIG. 2, the terminal 10B differs from the terminal 10A in that the hooking portion 16 is not provided. The terminal 10B includes a base plate portion 11, guided portions 12, locking portions 13, guide portions 14, a crimping portion 15 and resilient locking portions 17. The base plate portion 11 of the terminal 10B corresponds to an example of a “first base plate portion” of the present disclosure. The locking portions 13 and the locking portions 17 of the terminal 10B correspond to examples of the “lock portion” of the present disclosure.

As shown in FIG. 2, the terminal 10C differs from the terminal 10B in that a through hole 18C is larger in size than a through hole 18 of the terminal 10B. The terminal 10C includes a base plate portion 11, guided portions 12, locking portions 13, guide portions 14, a crimping portion 15 and resilient locking portions 17. The base plate portion 11 of the terminal 10C corresponds to an example of a “second base plate portion” of the present disclosure.

The circular through hole 18C is formed to penetrate through a central part of the base plate portion 11. The through hole 18C corresponds to an example of a “cut portion” of the present disclosure. The size (diameter) of the through hole 18C is larger than that of the through hole 18 of the terminal 10B. The size (diameter) of the through hole 18C is larger than that of the washer 34. The shaft portion 32 of the bolt 30 is inserted through the through hole 18C from above the combination terminal 1. The head portion 31 of the bolt 30 enters the through hole 18C in an assembled state of the terminals 10B and 10C. An annular planar portion 23C is provided around the through hole 18C in the base plate portion 11. The planar portion 23C corresponds to a “second planar portion” of the present disclosure.

As shown in FIG. 2, the terminal 10D differs from the terminal 10C in that the locking portions 17 are not provided. The terminal 10D includes a base plate portion 11, guided portions 12, locking portions 13, guide portions 14 and a crimping portion 15. The base plate portion 11 is not provided with a pair of contact point portions.

<Assembly Procedure of Combination Terminal>

Next, an assembly procedure of the combination terminal 1 according to the first embodiment is described.

The assembly of the combination terminal 1 is completed by the assembly of the terminals 10A and 10B, the assembly of the terminals 10B and 10C and the assembly of the terminals 10C and 10D. Each assembly procedure is described below. Note that, in the following description, “U” is attached to an end of a reference sing of each component of the terminal relatively located on an upper side, out of the terminals adjacent in the vertical direction, and “L” is attached to an end of a reference sing of each component of the terminal relatively located on a lower side.

Figure 4:
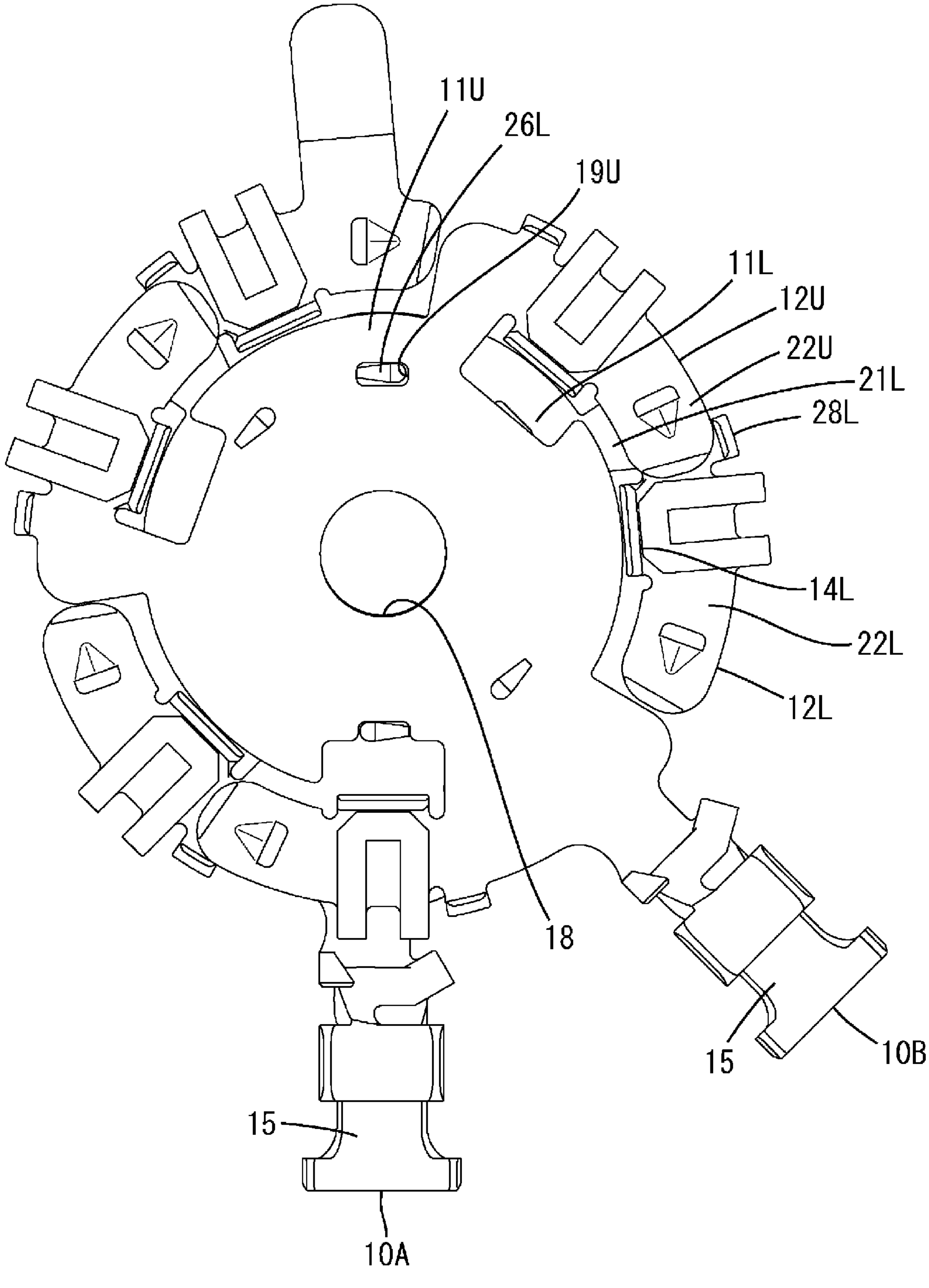
FIG. 4 is a plan view showing a state where two terminals on a lower side are set in an initial state.

In forming a combination terminal of two lower levels, the base plate portions 11 of the terminals 10A, 10B are so stacked in the vertical direction that the respective through holes 18 are concentric, and set in an initial state where the respective crimping portions 15 are open at an angle close to 45° centered on the through holes 18 as shown in FIG. 4.

In the initial state, tip parts of the body portions 22U of the guided portions 12U are located on the sides of the root portions 21L of the guided portions 12L. Further, the outer peripheral edges of the tip parts of the body portions 22U are arranged to contact the inner side surfaces of the outer peripheral guide portions 28L. Further, the inner side surfaces of the guide portions 14L are arranged to contact along the outer peripheral edge of the base plate portion 11U. Then, the respective contact point portions 26L are fit into the respective contact point receiving portions 19U, and the respective terminals 10A, 10B are temporarily fixed in the initial state.

Subsequently, the terminal 10B is relatively rotated in the circumferential direction about the through holes 18 from the initial state. In the case of the first embodiment, the terminal 10B is rotated in a direction to bring the respective crimping portions 15 closer to each other. Then, the body portions 22U of the guided portions 12U enter inside the locking portions 17L while sliding on the upper surfaces of the body portions 22L. Further, in a rotation step, the outer side surfaces of the guide portions 14L slide along the inner peripheral edges of the body portions 22U of the guided portions 12U and the outer peripheral guide portions 28L and the inner side surfaces of the locking portions 17L slide along the outer peripheral edges of the guided portions 12U. Further, in the rotation step, the locking portions 17L are resiliently deformed by the locking portions 13U.

Figure 5:
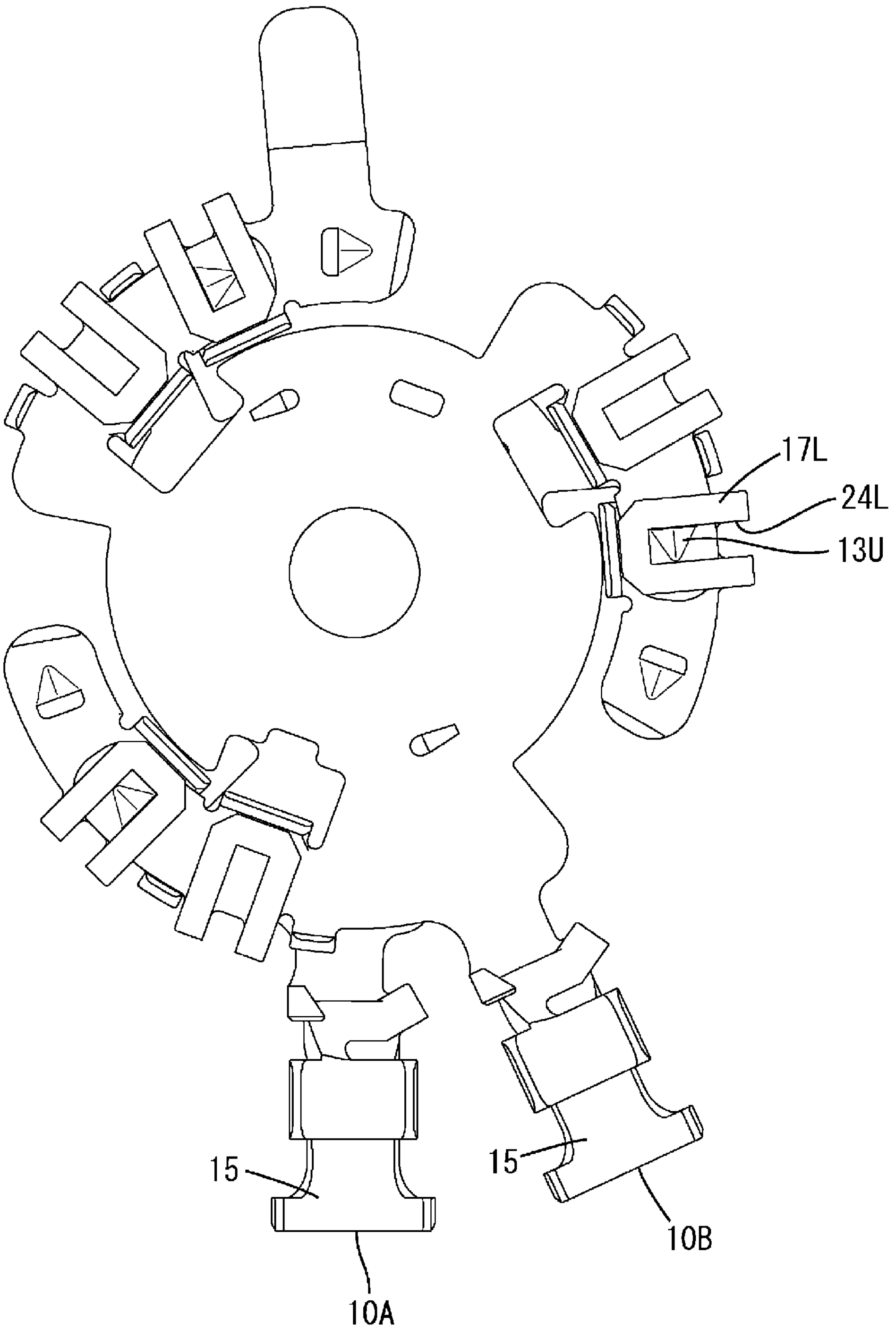
FIG. 5 is a plan view showing a state where the assembly of the terminals in FIG. 4 is completed.

When the rotation is completed, the locking portions 17L return to an original natural state and, as shown in FIG. 5, the locking portions 13U are fit into the locking holes 24L of the locking portions 17L. In this way, the rotation of the terminal 10B with respect to the terminal 10A is stopped and the terminals 10A, 10B are assembled in a proper state. At this time, the respective crimping portions 15 are open at an angle smaller than 45°. Further, when the rotation is completed, the respective contact point portions 26L contact the base plate portion 11U and the terminals 10A, 10B are conductively connected.

Figure 6:
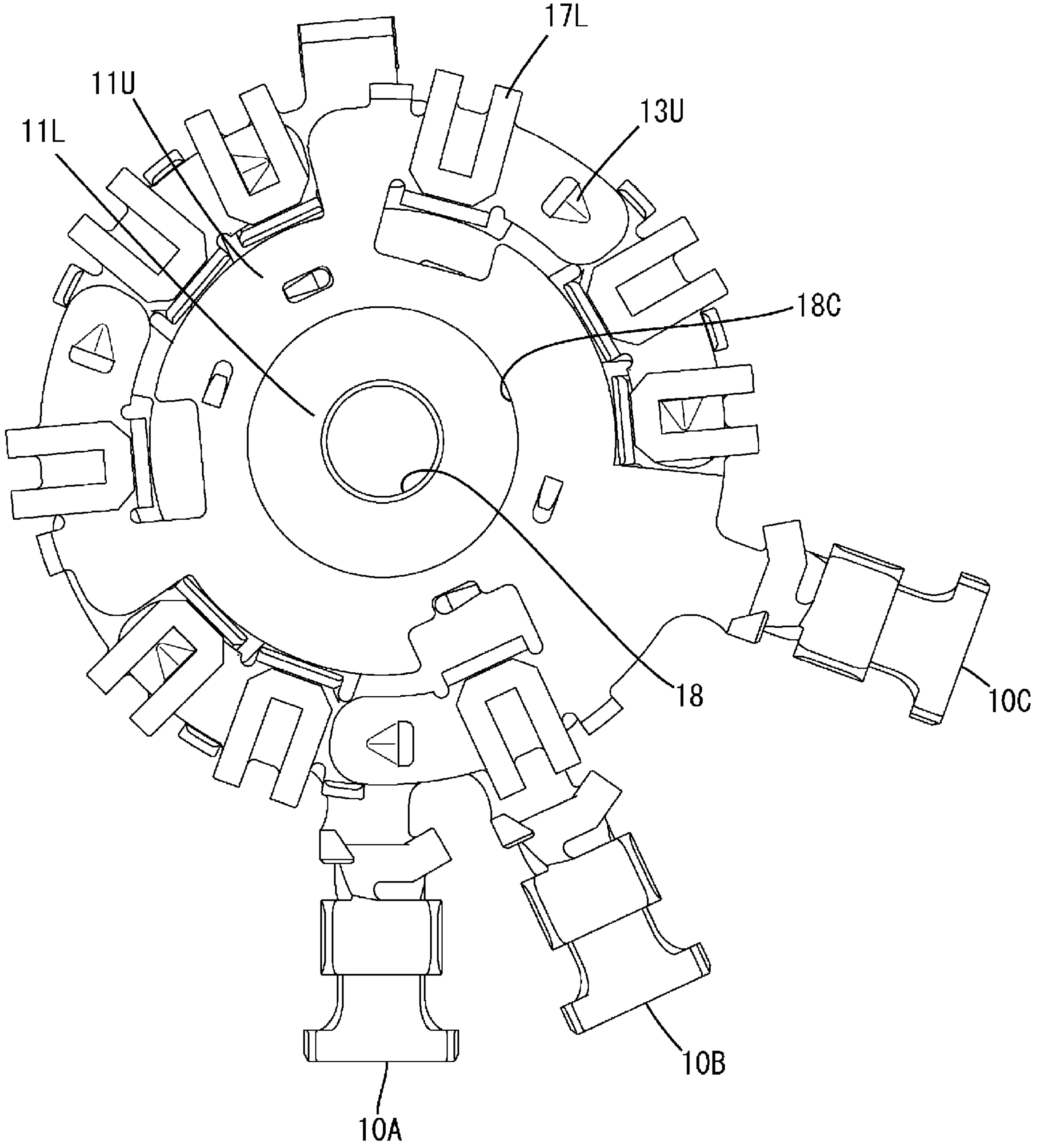
FIG. 6 is a plan view showing a state where the terminal on an upper side is further set in an initial state for a terminal assembly of FIG. 5.
Figure 7:
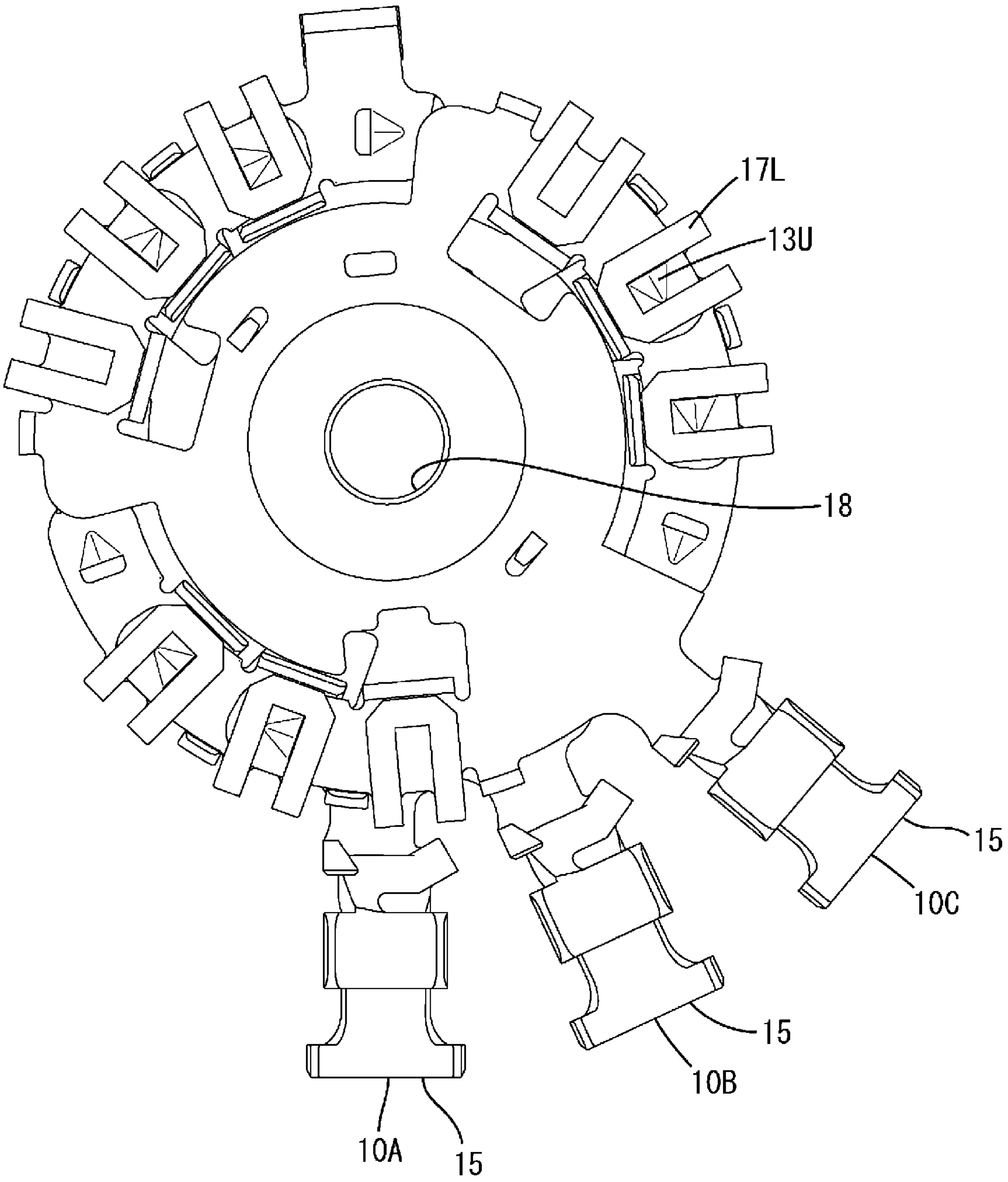
FIG. 7 is a plan view showing a state where the assembly of the terminals in FIG. 6 is completed.

In the case of further assembling the terminal 10C with the terminal 10B assembled with the terminal 10A, the terminal 10C is assembled in a procedure similar to the assembly procedure of the terminals 10A, 10B. First, as shown in FIG. 6, the base plate portion 11U of the terminal 10C is so stacked on the upper surface of the base plate portion 11L of the terminal 10B that the through holes 18 are concentric, and an initial state is set. Subsequently, as shown in FIG. 7, the terminal 10C is relatively rotated with respect to the terminal 10B. Then, similarly to the assembly of the terminals 10A, 10B, the locking portions 13U are locked to the locking portions 17L. By locking the locking portions 13U and the locking portions 17L to each other, the terminals 10B, 10C are locked in the assembled state. In this way, the terminals 10B, 10C are fixed in a positioned state.

Figure 8:
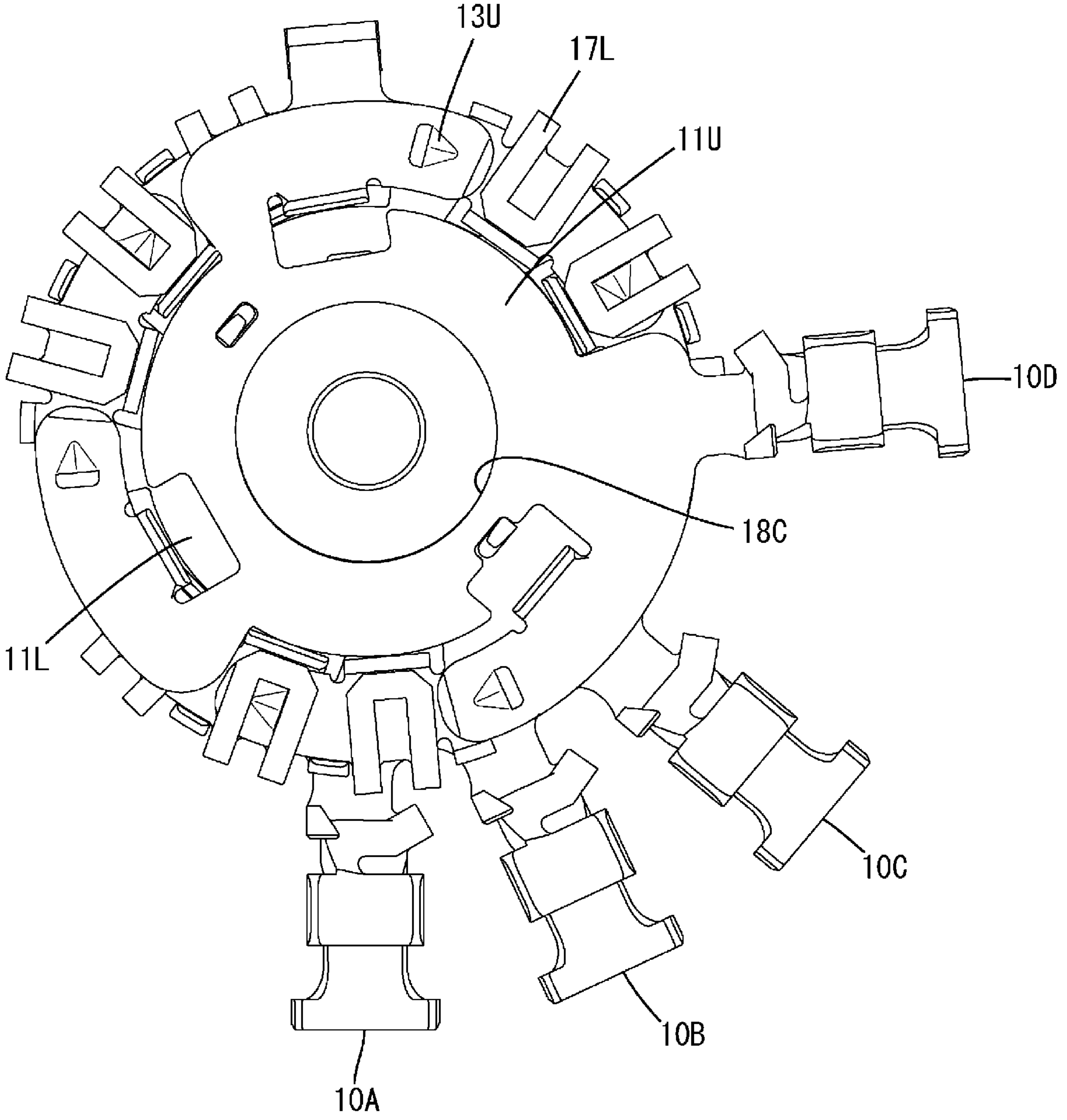
FIG. 8 is a plan view showing a state where the terminal on the upper side is further set in an initial state for a terminal assembly of FIG. 7.
Figure 9:
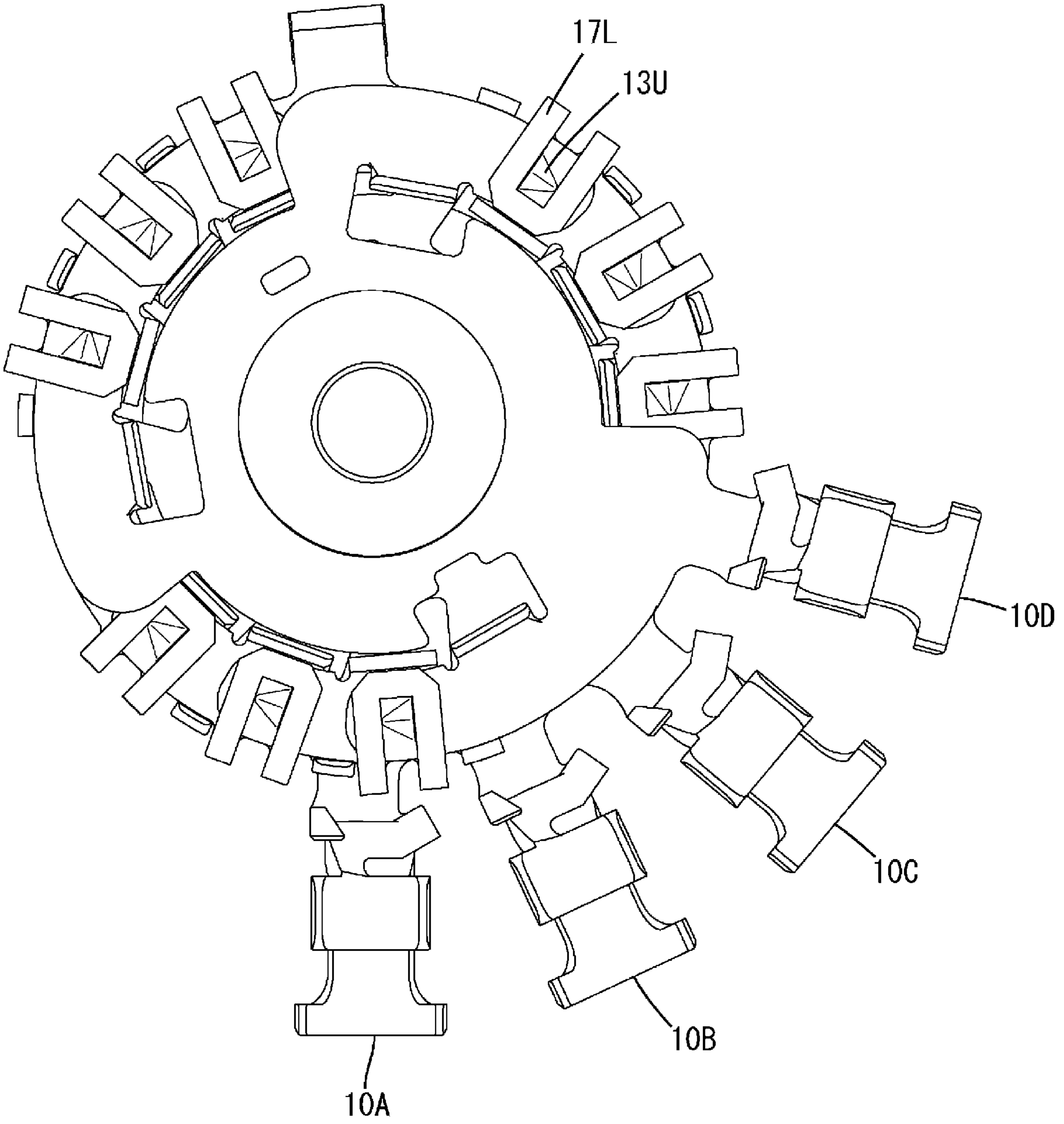
FIG. 9 is a plan view showing a state where the assembly of the terminals in FIG. 8 is completed.

In the case of further assembling the terminal 10D with the terminal 10C assembled with the terminals 10A, 10B, the terminal 10D is assembled in a procedure similar to the assembly procedure of the terminals 10A, 10B. First, as shown in FIG. 8, the base plate portion 11U of the terminal 10D is so stacked on the upper surface of the base plate portion 11L of the terminal 10C that the through holes 18 are concentric, and an initial state is set. Subsequently, as shown in FIG. 9, the terminal 10D is relatively rotated with respect to the terminal 10C. Then, similarly to the assembly of the terminals 10A, 10B, the locking portions 13U are locked to the locking portions 17L. In this way, the terminals 10C, 10D are fixed in a positioned state.

In the combination terminal 1 formed by assembling the terminals 10A, 10B, 10C and 10D, four crimping portions 15 are arranged at fixed intervals within a range of an opening angle of 90° centered on the through holes 18 as shown in FIG. 9. Further, since the respective guided portions 12 are stacked while the tip positions thereof are shifted in the circumferential direction, steps are formed between the respective terminals. Thus, the respective terminals are stacked in a step-like manner via the steps from the lowermost level to the uppermost level.

As shown in FIG. 1, the combination terminal 1 is fixed to the fixed member 40 using the bolt 30. First, the combination terminal 1 is positioned on the fixed member 40 by inserting the hooking portion 16 of the terminal 10A into a first hole 41 (see FIG. 2) provided in the fixed member 40. At this time, the through holes 18 of the respective terminals are set to be concentric with a circular second hole 42 (see FIG. 2) provided in the fixed member 40. The bolt 30 is assembled with the combination terminal 1 to insert the shaft portion 32 of the bolt 30 into the through holes 18 of the respective terminals and the second hole 42. The shaft portion 32 of the bolt 30 is, for example, tightened into a nut or the like provided on a lower surface side (side opposite to the combination terminal 1) of the fixed member 40. Specifically, the upper surface of the terminal 10B (surface of the base plate portion 11 on the side of the terminal 10C) is contacted by the head portion 31 of the bolt 30 and a tightening force is applied thereto. The head portion 31 of the bolt 30 enters the through holes 18C of the terminals 10C, 10D. The through holes 18C of the terminals 10C, 10D function to prevent the contact of the head portion 31 of the bolt 30 and the terminals 10C, 10D. The through holes 18C of the terminals 10C, 10D do not interfere with the head portion 31 of the bolt 30. The through holes 18C of the terminals 10C, 10D are not provided with a surface for receiving the tightening force from the head portion 31.

As just described, since the head portion 31 of the bolt 30 enters the through hole 18C of the terminal 10C with the combination terminal 1 fixed to the fixed member 40 using the bolt 30. Thus, the terminal 10C can be assembled with the terminal 10B without being tightened by the bolt 30. That is, the terminal 10B can be fixed to the fixed member 40 without the terminal 10C contacting the bolt 30. Thus, the terminal 10C can be attached to and detached from the terminal 10B regardless of a tightened state of the bolt 30. Therefore, a length of the shaft portion 32 of the bolt 30 needs not be set in consideration of a stacking height including the terminal 10C in advance. That is, the terminals can be fixed by only one type of bolt 30 even if the number of the terminals to be stacked is different. Further, in assembling the terminal 10C with the terminal 10B, a step of removing the bolt 30 and a step of tightening the bolt 30 again after the terminals are stacked are not necessary, and the number of steps can be reduced.

Figure 10:
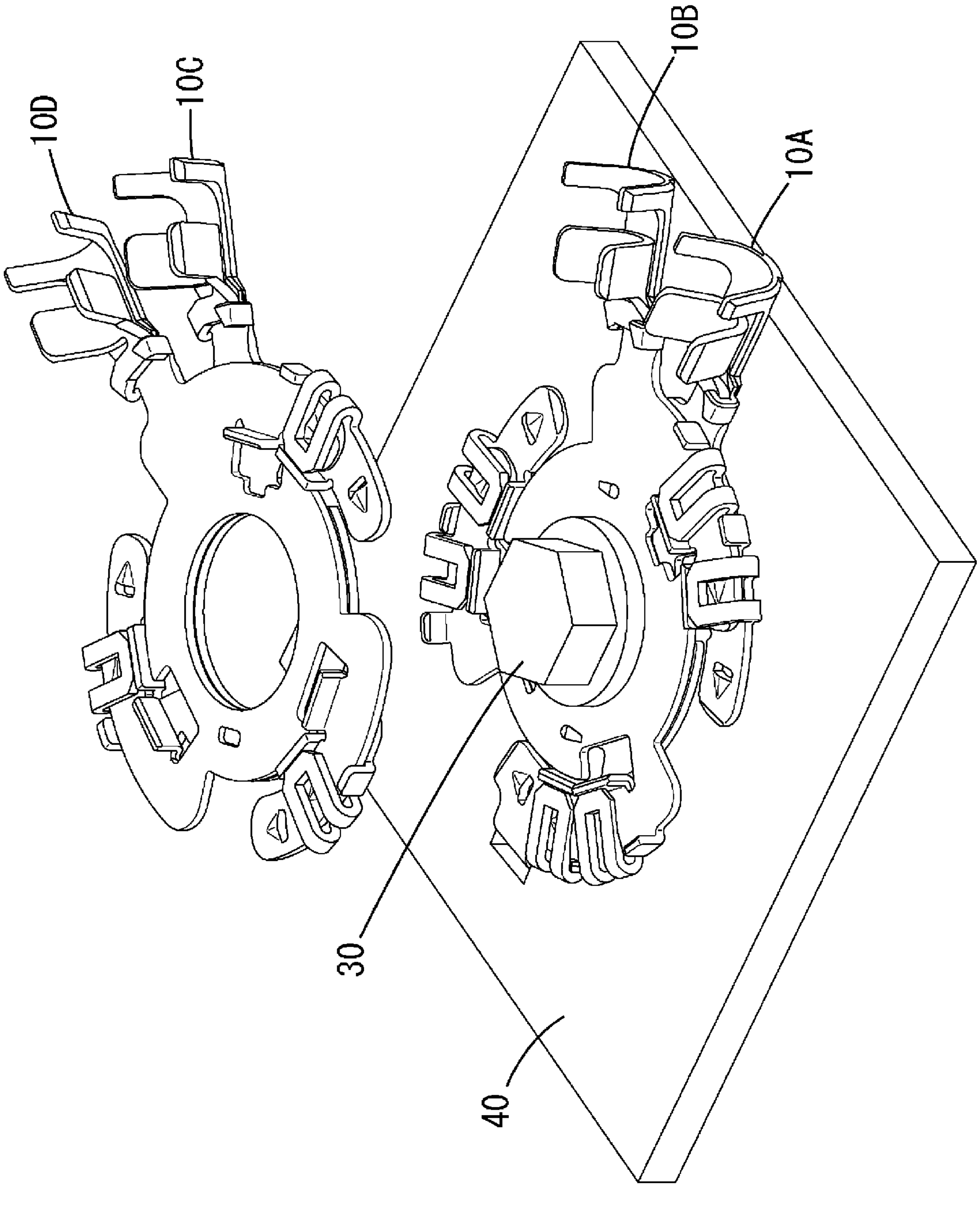
FIG. 10 is a view showing a procedure of retrofitting a terminal assembly formed by further assembling the two terminals on the upper side in a state where the terminal assembly formed by assembling the two terminals on the lower side is fixed to the fixed member.

As shown in FIG. 10, a terminal assembly formed by assembling the terminals 10A, 10B may be fixed to the fixed member 40 using the bolt 30 and a terminal assembly formed by assembling the terminals 10C, 10D may be retrofit. In this case, the terminals 10C, 10D are retrofit by the assembly procedure of the terminals 10B, 10C (see FIGS. 6 and 7). Note that only the terminal 10C may be retrofit to the terminal assembly formed by assembling the terminals 10A, 10B.

Since the planar portion 23C is provided on the base plate portion 11 of the terminal 10C, the posture of a jig such as a wrench can be stabilized in fixing a terminal assembly formed by assembling the terminals 10A, 10B and 10C (see a state of FIG. 7) to the fixed member 40 using the bolt 30. Specifically, the posture of the jig such as a wrench during a rotating operation or the like is stabilized by bringing the jig into contact with the upper surface of the planar portion 23C.

A rotation direction (clockwise direction when viewed from above) of the upper terminal with respect to the lower terminal to lock the locking portions 13 and the resilient locking portions 17 is the same direction as a tightening direction (clockwise direction when viewed from above) of the bolt 30 with respect to the terminal 10B. Thus, the bolt 30 is hardly loosened in rotating the terminals 10C, 10D with respect to the terminal 10B.

Second Embodiment

Figure 14:
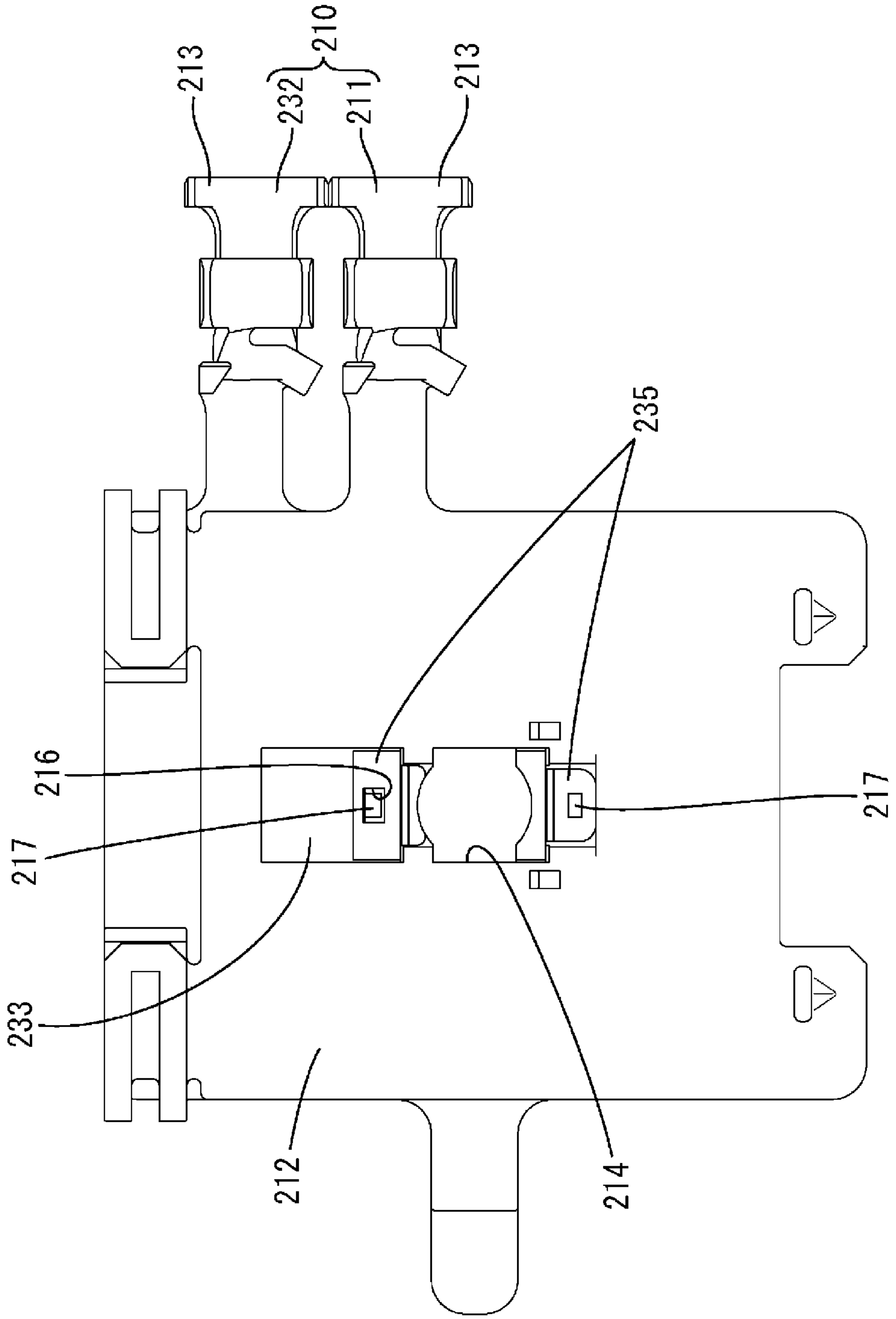
FIG. 14 is a plan view showing a state where a first terminal fitting and a first sub-terminal are assembled.
Figure 15:
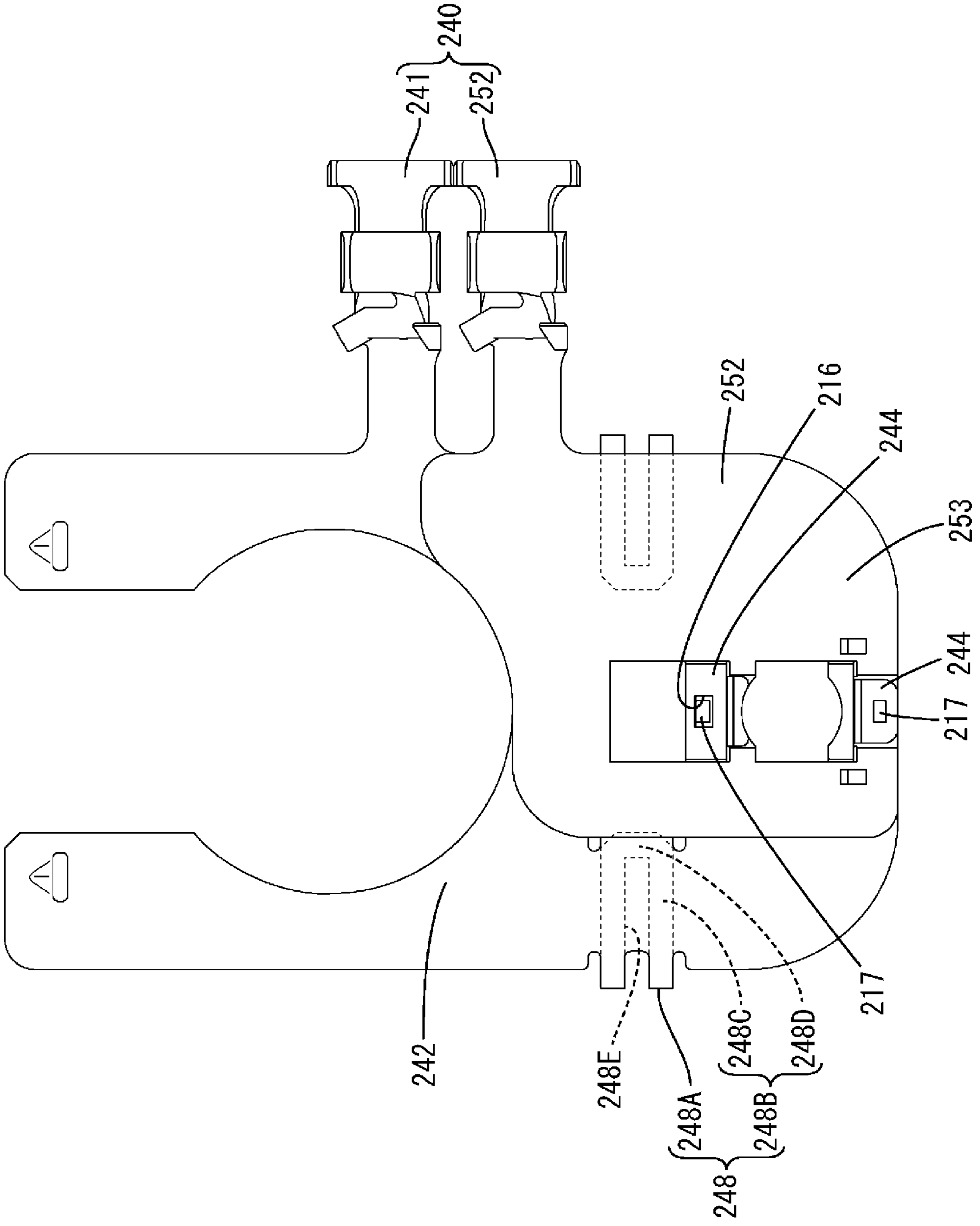
FIG. 15 is a plan view showing a state where a second terminal fitting and a second sub-terminal are assembled.
Figure 16:
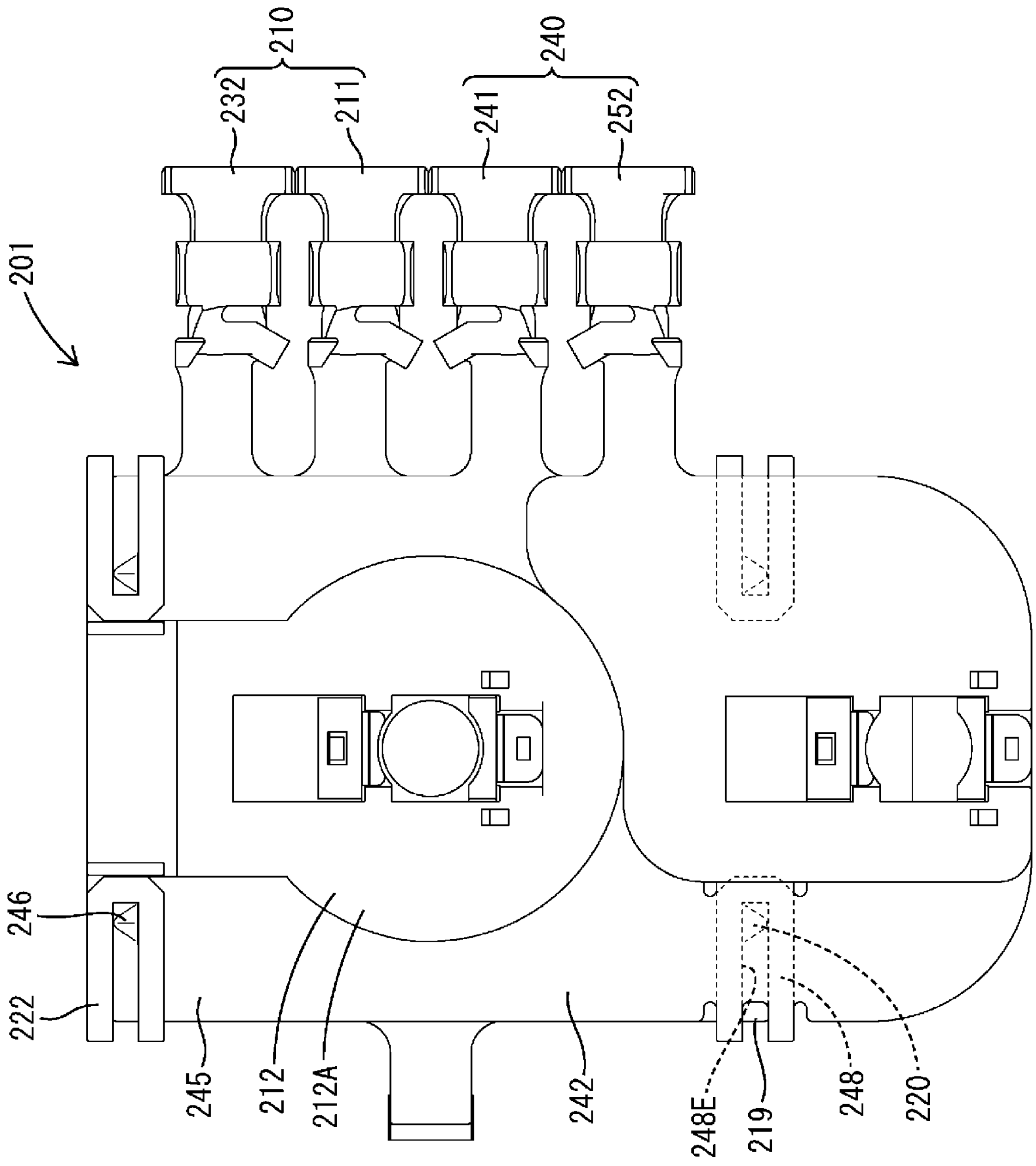
FIG. 16 is a plan view showing a state where a first terminal module and a second terminal module are assembled.

FIGS. 11 to 17 are views showing a combination terminal of a second embodiment. The combination terminal of the second embodiment embodying the combination terminal of the present disclosure is described with reference to FIGS. 11 to 17. In the second embodiment, an oblique left lower side in FIGS. 11 to 13 and 17 is defined as a front side concerning a front-rear direction. Upper and lower sides shown in FIGS. 11 to 13 and 17 are directly defined as upper and lower sides concerning a vertical direction. An oblique left upper side in FIGS. 11 to 13 and 17 is defined as a left side and a lateral direction in FIGS. 14 to 16 is directly defined as a lateral direction concerning the lateral direction.

Figure 11:
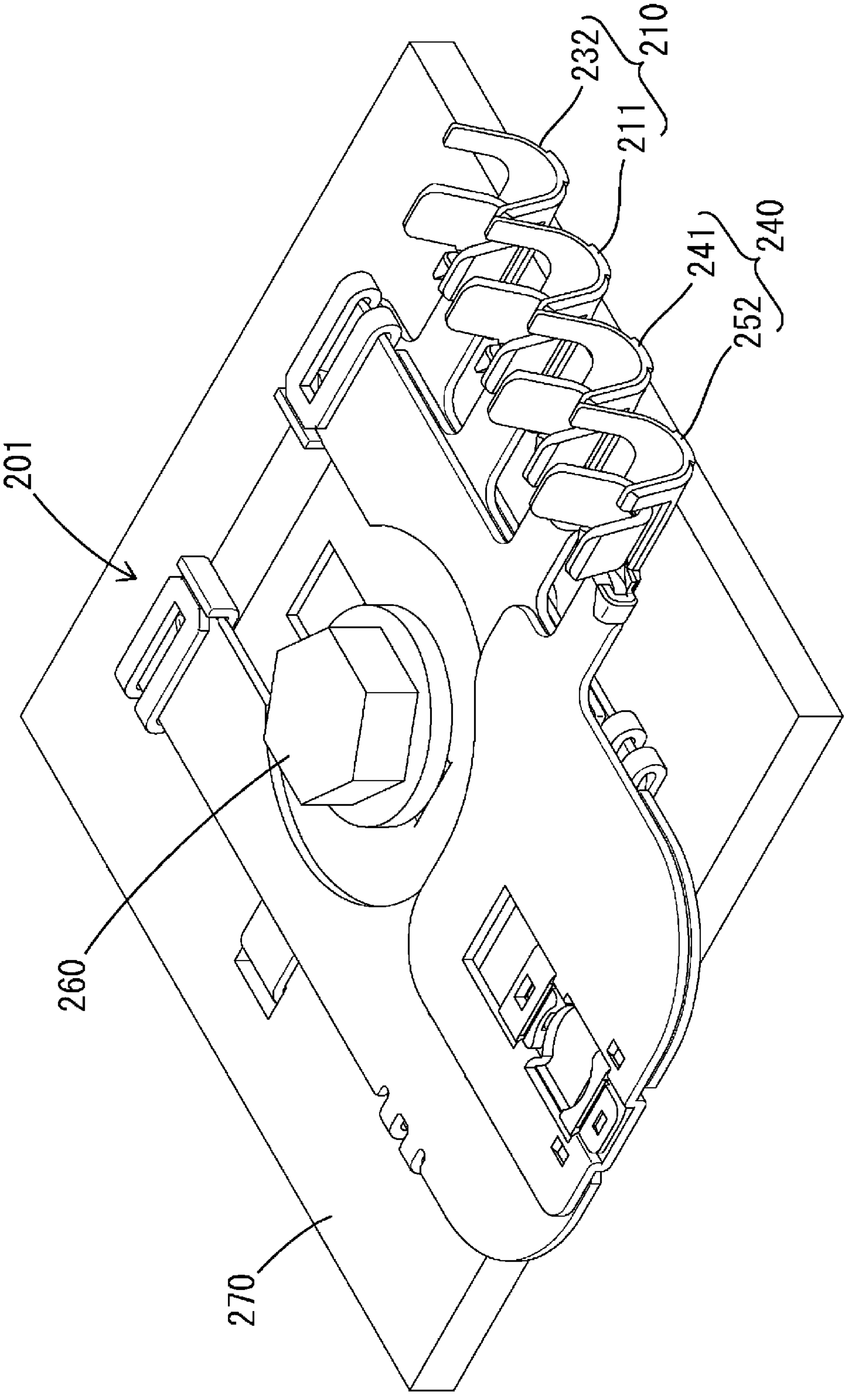
FIG. 11 is a perspective view showing a state where a combination terminal according to a second embodiment is fixed to a fixed member.

A combination terminal 201 of the second embodiment is configured by assembling a first terminal module 210 and a second terminal module 240 as shown in FIG. 11. As shown in FIG. 14, the first terminal module 210 is configured by assembling a first terminal fitting 211 and a first sub-terminal 232. As shown in FIG. 15, the second terminal module 240 is configured by assembling a second terminal fitting 241 and a second sub-terminal 252. The first terminal fitting 211 corresponds to the "first terminal" of the present disclosure. The second terminal fitting 241 corresponds to the "second terminal" of the present disclosure.

<First Terminal Module 210>

Figure 12:
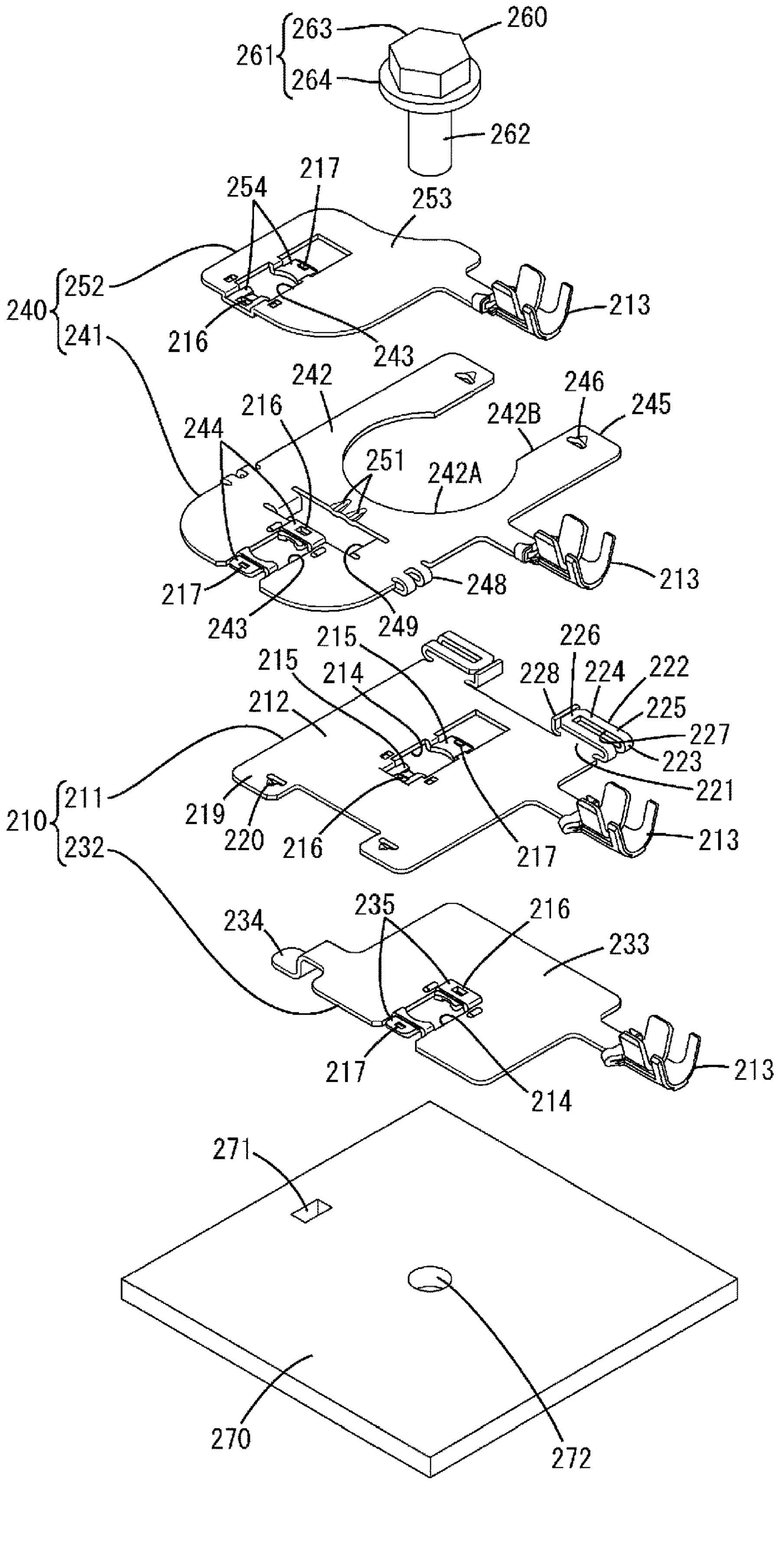
FIG. 12 is an exploded perspective view of FIG. 11.
Figure 13:
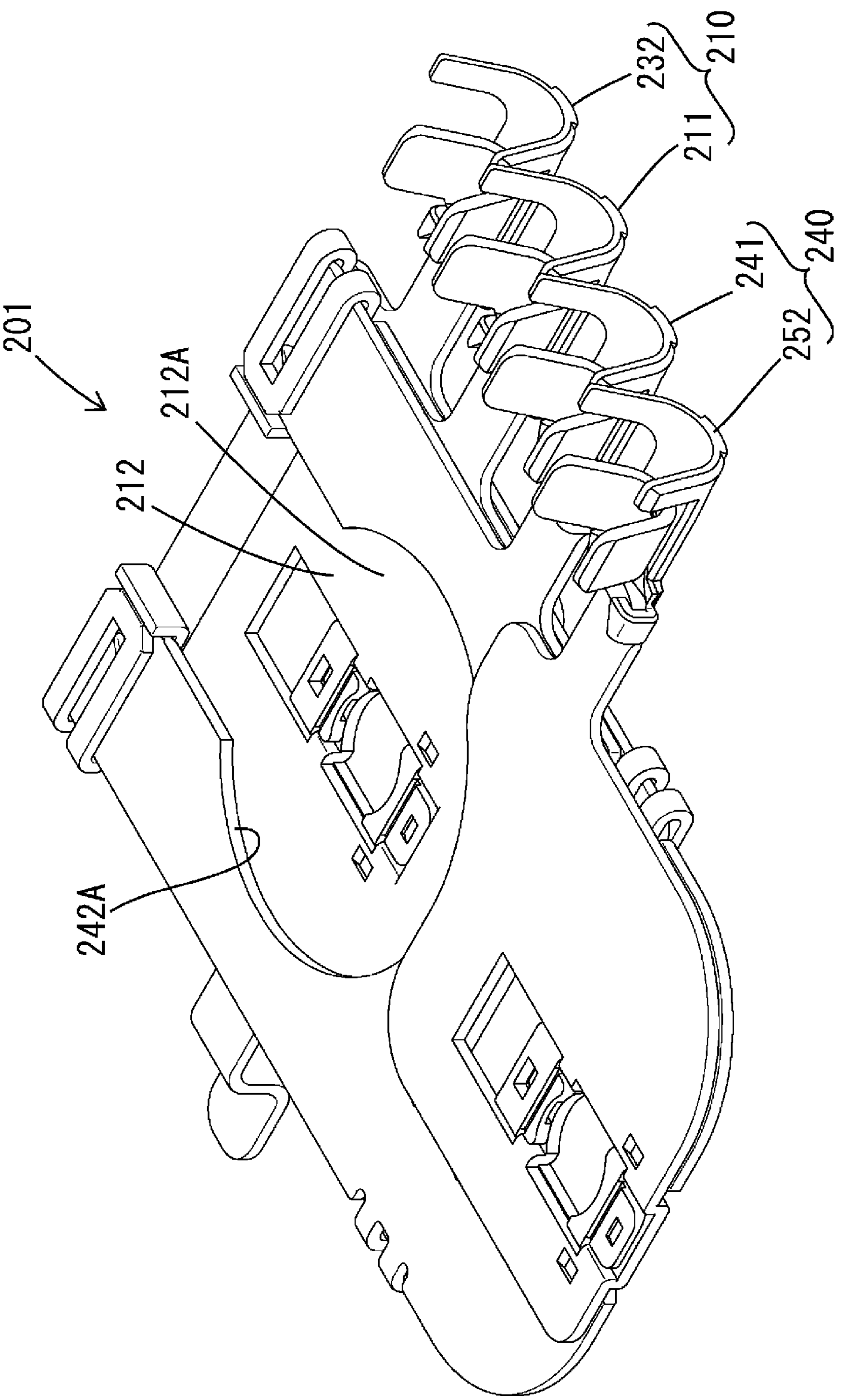
FIG. 13 is a perspective view of the combination terminal.

The first terminal fitting 211 is a single component formed, such as by bending a metal plate material of a predetermined shape. As shown in FIG. 12, the first terminal fitting 211 includes one first base plate portion 212 having a plate thickness direction oriented in the vertical direction and a crimping portion 213 in the form of an open barrel extending rightward from the right end edge of the first base plate portion 212. A first bolt hole 214 penetrating through the first base plate portion 212 in the plate thickness direction is formed in a central part of the first base plate portion 212.

A pair of front and rear first receiving portions 215 are formed on a hole edge part of the first bolt hole 214. The first receiving portion 215 is arranged at a position lower than the first base plate portion 212 by a plate thickness of the first base plate portion 212 via a step. The front first receiving portion 215 is formed with a retaining hole 216, and the rear first receiving portion 215 is formed with a retaining projection 217.

The first base plate portion 212 is formed with a pair of first lock fitting portions 219 spaced apart in the lateral direction. The pair of first lock fitting portions 219 are flat plate-like parts projecting forward in flush with the first base plate portion 212 from the front end edge of the first base plate portion 212. Each first lock fitting portion 219 is formed with a first lock portion 220 by striking a part of the first lock fitting portion 210 toward a lower surface side into a triangular shape. The first lock portion 220 corresponds to an example of the "lock portion" of the present disclosure.

The first base plate portion 212 is formed with a pair of first lock supporting portions 221 spaced apart in the lateral direction. The pair of first lock supporting portions 221 are flat plate-like parts projecting rearward in flush with the first base plate portion 212 from the rear end edge of the first base plate portion 212. Each first lock supporting portion 221 is integrally formed with a first resilient lock piece 222 and a first protecting portion 228. The first resilient lock piece 222 corresponds to an example of the "lock portion" of the present disclosure.

The first resilient lock piece 222 formed on the right first lock supporting portion 221 is in the form of a cantilever extending from the rear end edge of the first lock supporting portion 221. The first resilient lock piece 222 includes a bent portion 223 and a folded portion 224. The bent portion 223 is a part semicircularly bent toward an upper surface side of the first lock supporting portion 221 from the right end edge of the first lock supporting portion 221. The folded portion 224 is a flat plate-like part cantilevered in parallel to the first lock supporting portion 221 from the upper end edge of the bent portion 223. A base end part 225 of the folded portion 224 is linked to the bent portion 223, and an extending end part 226 of the folded portion 224 is located at a tip part of the first resilient lock piece 222.

The first resilient lock piece 222 is formed with one slit 227 along an extension direction from the first lock supporting portion 221. A formation range of the slit 227 in the extension direction is a region excluding the entire bent portion 223 and the extending end part 226 of the folded portion 224. The first resilient lock piece 222 can be resiliently displaced in a direction separating from the upper surface of the first lock supporting portion 221, i.e. upward, with the bent portion 223 as a fulcrum while the bent portion 223 and the folded portion 224 are resiliently deformed.

The first protecting portion 228 formed on the right first lock supporting portion 221 projects toward the upper surface side of the first lock supporting portion 221 from the left end edge of the first lock supporting portion 221. The first protecting portion 228 is in the form of a rib extending straight in the lateral direction. The first protecting portion 228 is arranged on the left end edge of the first resilient lock piece 222, i.e. arranged laterally side by side with the extending end part 226 without almost any gap therebetween. The upper end of the first protecting portion 228 is at the same height as the upper surface of the first resilient lock piece 222. The first protecting portion 228 is located to cover a gap between the upper surface of the first lock supporting portion 221 and the lower surface of the folded portion 224 from left.

The first resilient lock piece 222 formed on the left first lock supporting portion 221 has a shape symmetrical with the first resilient lock piece 222 of the right first lock supporting portion 221. The first protecting portion 228 formed on the left first lock supporting portion 221 has a shape symmetrical with the first protecting portion 228 of the right first lock supporting portion 221.

The first sub-terminal 232 is a single component formed, such as by bending a metal plate material of a predetermined shape. The first sub-terminal 232 includes one first plate-like base portion 233 having a plate thickness direction oriented in the vertical direction and a crimping portion 213 in the form of an open barrel extending rightward from the right end edge of the first plate-like base portion 233. A step-like rotation stop portion 234 is formed on a left end part of the first plate-like base portion 233. The rotation stop portion 234 is locked to a body of an automotive vehicle (not shown), which is a mounting object of the combination terminal of the first embodiment. By locking the rotation stop portion 234 to the body, the combination terminal can be prevented from rotating together when the combination terminal is bolted to the body.

The first plate-like base portion 233 is formed with a first bolt hole 214 penetrating through the first plate-like base portion 233 in the plate thickness direction. A pair of inner and outer first covering portions 235 are formed on a hole edge part of the first bolt hole 214. The first covering portion 235 is arranged at a position higher than the first plate-like base portion 233 by a plate thickness of the first plate-like base portion 233 via a step. The outer first covering portion 235 is formed with a retaining projection 217, and the inner first covering portion 235 is formed with a retaining hole 216.

As shown in FIG. 14, with the first terminal fitting 211 and the first sub-terminal 232 assembled, the first base plate portion 212 is stacked on the upper surface of the first plate-like base portion 233 and the first covering portions 235 are stacked on the upper surfaces of the first receiving portions 215, whereby the first terminal fitting 211 and the first sub-terminal 232 are held not to be separated in the plate thickness direction. The retaining hole 216 and the retaining projection 217 of the first receiving portions 215 are locked to the retaining projection 217 and the retaining hole 216 of the first covering portions 235, whereby the first terminal fitting 211 and the first sub-terminal 232 are held not to be separated in the front-rear direction.

In an assembled state of the first terminal module 210, the first bolt hole 214 of the first terminal fitting 211 and the first bolt hole 214 of the first sub-terminal 232 are coaxially arranged and the crimping portion 213 of the first terminal fitting 211 and the crimping portion 213 of the first sub-terminal 232 are arranged laterally adjacent.

<Second Terminal Module 240>

The second terminal fitting 241 is a single component formed, such as by bending a metal plate material of a predetermined shape. As shown in FIG. 12, the second terminal fitting 241 includes one second base plate portion 242 having a plate thickness direction oriented in the vertical direction and a crimping portion 213 in the form of an open barrel extending rightward from the right end edge of the second base plate portion 242. A second bolt hole 243 penetrating through the second base plate portion 242 in the plate thickness direction is formed in a central part of the second base plate portion 242.

A pair of front and rear second receiving portions 244 are formed on a hole edge part of the second bolt hole 243. The second receiving portion 244 is arranged at a position higher than the second base plate portion 242 by a plate thickness of the second base plate portion 242 via a step. The front second receiving portion 244 is formed with a retaining projection 217, and the rear second receiving portion 244 is formed with a retaining projection 216.

The second base plate portion 242 is formed with a pair of second lock fitting portions 245 spaced apart in the lateral direction. The pair of second lock fitting portions 245 are flat plate-like parts projecting rearward in flush with the second base plate portion 242 from the rear end edge of the second base plate portion 242. Each second lock fitting portion 245 is formed with a second lock portion 246 by striking a part of the second lock fitting portion 245 toward an upper surface side into a triangular shape. The second lock portion 246 corresponds to an example of the "lock portion" of the present disclosure.

The second base plate portion 242 is formed with a pair of second resilient lock pieces 248 and a pair of second protecting portions 249. The second resilient lock piece 248 corresponds to an example of the "lock portion" of the present disclosure. The right second resilient lock piece 248 has a cantilever shape extending from the right end edge of the second base plate portion 242. As shown in FIG. 15, the second resilient lock piece 248 includes a bent portion 248A and a folded portion 248B. The bent portion 248A is a part semicircularly bent toward a lower surface side of the second base plate portion 242 from the right end edge of the second base plate portion 242. The folded portion 248B is a flat plate-like part cantilevered leftward in parallel to the second base plate portion 242 from the bent portion 248A. A base end part 248C of the folded portion 248B is linked to the bent portion 248A, and an extending end part 248D of the folded portion 248B is located at a tip part of the second resilient lock piece 248.

The second resilient lock piece 248 is formed with one slit 248E along an extension direction from the second base plate portion 242. A formation range of the slit 248E in the extension direction is a region excluding the entire bent portion 248A and the extending end part 248D of the folded portion 248B. The second resilient lock piece 248 can be resiliently displaced in a direction separating from the lower surface of the second base plate portion 242, i.e. downward, with the bent portion 248A as a fulcrum while the bent portion 248A and the folded portion 248B are resiliently deformed.

The right second protecting portion 249 projects toward the lower surface side. The second protecting portion 249 is in the form of a rib extending straight in the front-rear direction. The second protecting portion 249 is arranged side by side with the left end edge of the second resilient lock piece 248, i.e. arranged without almost any gap between the extending end part 238D and the second protecting portion 249, in the lateral direction. The lower end of the second protecting portion 249 is at the same height as the lower surface of the second resilient lock piece 248. The second protecting portion 249 is located to cover a gap between the lower surface of the second base plate portion 242 and the upper surface of the folded portion 248B from left.

The left second resilient lock piece 248 has a shape symmetrical with the right second resilient lock piece 248. The left second protecting portion 249 has a shape symmetrical with the right second protecting portion 249.

The second base plate portion 242 is provided with a first cut portion 242A and a second cut portion 242B. The first cut portion 242A corresponds to an example of the "cut portion" of the present disclosure. The first cut portion 242A is provided at a position slightly more rearward than a central part of the second base plate portion 242. The size (diameter) of the first cut portion 242A is larger than that of the first bolt hole 214. The size (diameter) of the first cut portion 242A is larger than that of a washer 264. The first cut portion 242A is a circular through hole penetrating through the second base plate portion 242 in the plate thickness direction. The second cut portion 242B is a rectangular cut extending rearward from the first cut portion 242A of the second base plate portion 242. The rear end of the second cut portion 242B is open rearward from the rear end of the second base plate portion 242. The second cut portion 242B is provided between the pair of second lock fitting portions 245.

In an assembled state of the first terminal fitting 211 and the second terminal fitting 241, the first base plate portion 212 of the first terminal fitting 211 is exposed in the first cut portion 242A. Specifically, a central part of the first base plate portion 212 (an outer peripheral part of the first bolt hole 214) is exposed upward in the first cut portion 242A. This exposed part is referred to as a first planar portion 212A. A pair of second contact point portions 251 are formed in front of the first cut portion 242A on the second base plate portion 242. The pair of second contact point portions 251 are arranged laterally adjacent and project toward an upper surface side of the second base plate portion 242.

The second sub-terminal 252 is a single component formed, such as by bending a metal plate material of a predetermined shape. The second sub-terminal 252 includes one second plate-like base portion 253 having a plate thickness direction oriented in the vertical direction and a crimping portion 213 in the form of an open barrel extending rightward from the right end edge of the second plate-like base portion 253. The second plate-like base portion 253 is formed with a second bolt hole 243 penetrating through the second plate-like base portion 253 in the plate thickness direction. A pair of front and rear second receiving portions 254 are formed on a hole edge part of the second bolt hole 243. The second receiving portion 254 is arranged at a position lower than the second plate-like base portion 253 by a plate thickness of the second plate-like base portion 253 via a step. The front second receiving portion 254 is formed with a retaining hole 216, and the rear second receiving portion 254 is formed with a retaining projection 217.

As shown in FIG. 15, with the second terminal fitting 241 and the second sub-terminal 252 assembled, the second plate-like base portion 253 is stacked on the upper surface of the second base plate portion 242 and the second covering portions 244 are stacked on the upper surfaces of the second receiving portions 254 (see FIG. 12), whereby the second terminal fitting 241 and the second sub-terminal 252 are held not to be separated in the plate thickness direction. The retaining projection 217 and the retaining hole 216 of the second covering portions 244 are locked to the retaining hole 216 and the retaining projection 217 of the second receiving portions 254, whereby the second terminal fitting 241 and the second sub-terminal 252 are held not to be separated in the front-rear direction.

In an assembled state of the second terminal module 240, the first cut portion 242A of the second terminal fitting 241 and the second bolt hole 243 of the second sub-terminal 252 are coaxially arranged and the crimping portion 213 of the second terminal fitting 241 and the crimping portion 213 of the second sub-terminal 252 are arranged adjacent in the front-rear direction.

<Assembly Procedure of First Terminal Module 210 and Second Terminal Module 240>

The both terminal modules 210, 240 are assembled by stacking the second base plate portion 242 on the upper surface of the first base plate portion 211 while bringing the second terminal fitting 241 closer to the first terminal fitting 211 from front, inserting projecting end parts of the second lock fitting portions 245 between the first lock supporting portions 221 and the first resilient lock pieces 222 and inserting projecting end parts of the first lock fitting portions 219 between the second base plate portion 242 and the second resilient lock pieces 248. The first terminal fitting 211 and the second terminal fitting 241 are locked by being relatively displaced in a direction intersecting a stacking direction.

In the process of assembling the both terminal modules 210, 240, the second resilient lock pieces 248 are resiliently deformed downward due to interference with the first lock portions 220 at the same time as the first resilient lock pieces 222 are resiliently deformed upward due to interference with the second lock portions 246. The pair of first lock fitting portions 219 slide in contact with the pair of second protecting portions 249 to sandwich the pair of second protecting portions 249 from left and right sides, and the pair of second lock fitting portions 245 slide in contact with the pair of first protecting portions 228 to sandwich the pair of first protecting portions 228 from left and right sides, whereby relative displacements of the both terminal modules 210, 240 in the lateral direction are restricted.

When the both terminal modules 210, 240 reach a properly assembled state, the first bolt hole 214, the second bolt hole 243 and the first cut portion 242A are coaxially arranged. The first resilient lock pieces 222 resiliently return and the second lock portions 246 are locked into the slits 227 of the first resilient lock pieces 222. The second resilient lock pieces 248 resiliently return and the first lock portions 220 are locked into the slits 248E of the second resilient lock pieces 248. By these locking actions, the both terminal modules 210, 240 are locked not to be separated in the lateral direction and the assembly of the combination terminal is completed.

As shown in FIG. 11, the combination terminal 201 is fixed to a fixed member 270 using a bolt 260. The configurations of the bolt 260 and the fixed member 270 are the same as those of the bolt 30 and the fixed member 40 of the first embodiment. First, the combination terminal 201 is positioned on the fixed member 270 by inserting the rotation stop portion 234 into a first hole 271 (see FIG. 12) provided in the fixed member 270. At this time, the first bolt hole 214, the second bolt hole 243 and the first cut portion 242A on the same axis are set to be concentric with a circular second hole 272 (see FIG. 12) provided in the fixed member 270. The bolt 260 is so assembled with the combination terminal 201 that a shaft portion 262 of the bolt 260 is inserted through the first bolt hole 214, the second bolt hole 243 and the first cut portion 242. The shaft portion 262 of the bolt 260 is, for example, tightened into a nut or the like provided on a lower surface side (side opposite to the combination terminal 201) of the fixed member 270. Specifically, the upper surface of the first plate-like base portion 233 is contacted by the head portion 261 of the bolt 260 and a tightening force is applied thereto. The head portion 261 of the bolt 260 enters the first cut portion 242A of the second terminal fitting 241. The first cut portion 242A functions to prevent the contact of the head portion 261 of the bolt 260 and the second terminal fitting 240. The first cut portion 242A of the second terminal fitting 241 does not interfere with the head portion 261 of the bolt 260. The first cut portion 242A of the second terminal fitting 241 is not provided with a surface for receiving the tightening force from the head portion 261.

As just described, since the head portion 261 of the bolt 260 enters the first cut portion 242A of the second terminal fitting 241 with the combination terminal 201 fixed to the fixed member 270 using the bolt 260, the second terminal fitting 241 can be assembled with the first terminal fitting 211 without being tightened by the bolt 260. That is, the first terminal fitting 211 can be fixed to the fixed member 270 without the second terminal fitting 241 contacting the bolt 260. Thus, the second terminal fitting 241 can be attached to and detached from the first terminal fitting 211 regardless of a tightened state of the bolt 260. Therefore, a length of the shaft portion 262 of the bolt 260 needs not be set in consideration of a stacking height including the second terminal fitting 241 in advance. That is, the terminals can be fixed by only one type of bolt 260 even if the number of the terminals to be stacked is different. Further, in assembling the second terminal fitting 241 with the first terminal fitting 211, a step of removing the bolt 260 and a step of tightening the bolt 260 again after the terminals are stacked are not necessary, and the number of steps can be reduced.

Figure 17:
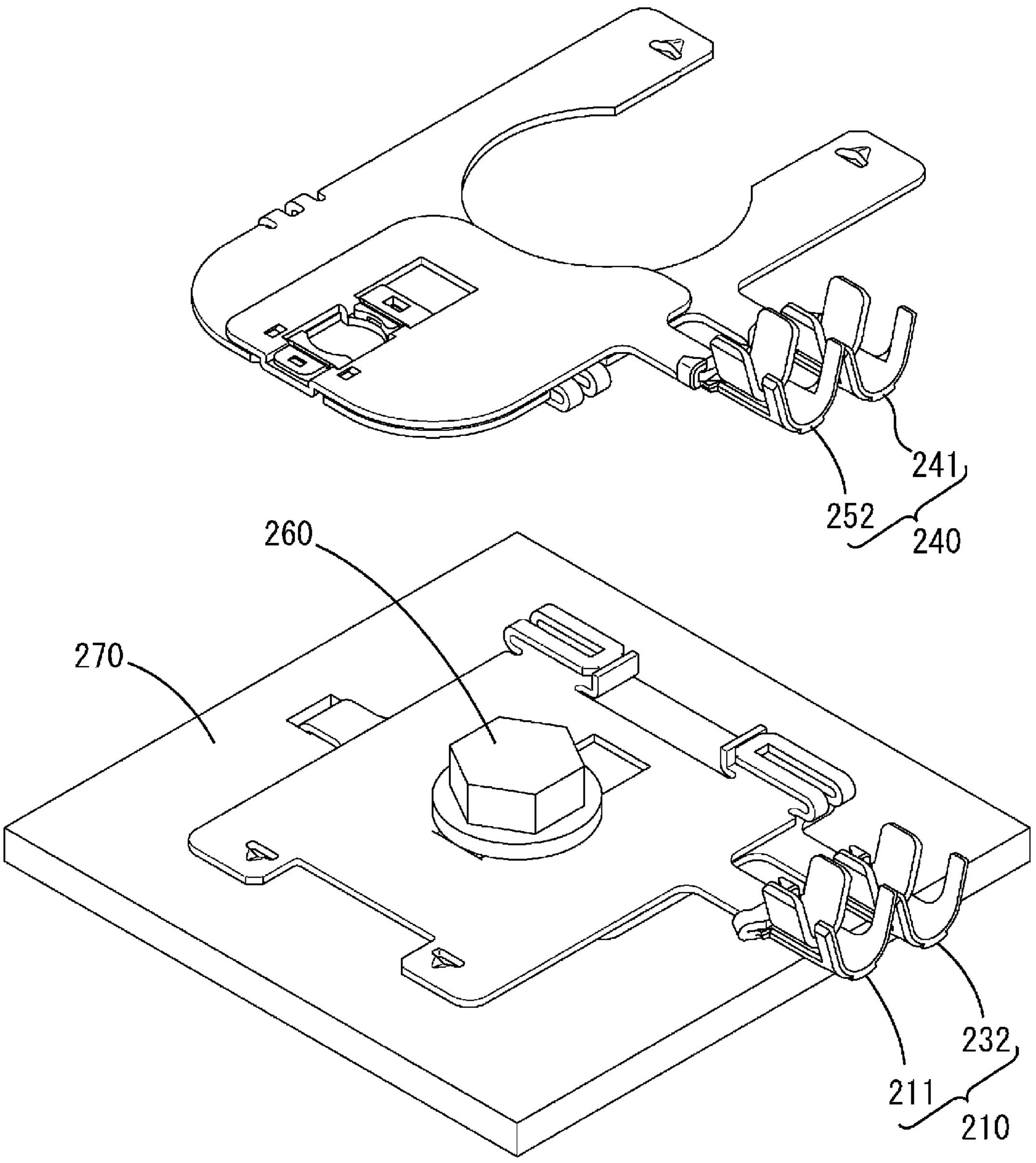
FIG. 17 is a view showing a procedure of retrofitting the second terminal module in a state where the first terminal module is fixed to a fixed member.

As shown in FIG. 17, the first terminal module 210 may by fixed to the fixed member 270 using the bolt 260 and the second terminal module 240 may be retrofit. Note that only the second terminal fitting 241 may be retrofit to the first terminal module 210.

Since the first planar portion 212A of the first terminal fitting 211 is exposed in the first cut portion 242A, the posture of a jig such as a wrench for tightening the bolt 260 can be stabilized in fixing the first terminal fitting 211 to the fixed member 270 using the bolt 260. Specifically, the posture of the jig such as a wrench during a rotating operation or the like is stabilized by bringing the jig into contact with the upper surface of the first planar portion 212A.

Other Embodiments

The present invention is not limited to the above described and illustrated embodiments, but is represented by claims. The present invention is intended to include all changes in the scope of claims and in the meaning and scope of equivalents and also include the following embodiments.

In the above first embodiment, the combination terminal may be configured by assembling the terminals 10A, 10B and 10D. In this case, the terminal 10B corresponds to the “first terminal” of the present disclosure, and the terminal 10D corresponds to the “second terminal” of the present disclosure. The combination terminal may be configured by assembling the terminals 10A, 10C and 10D. In this case, the terminal 10A corresponds to the “first terminal” of the present disclosure, and the terminal 10C corresponds to the “second terminal” of the present disclosure.

In the above first embodiment, a plurality of the terminals 10B may be assembled and stacked. Similarly, a plurality of the terminals 10C may be assembled and stacked.

Although the guided portions and the resilient locking portions are arranged at three positions on the outer peripheral side of the base plate portion in the above first embodiment, the guided portion and the resilient locking portion may be arranged at only one position or the guided portions and the resilient locking portions may be arranged at four or more positions.

Although the resilient locking portion and the guide portion are provided to be integrally continuous with the guided portion in the above embodiment, at least one of the resilient locking portion and the guide portion may be provided separately from the guided portion.

Although the terminal 10D includes no resilient locking portion in the above embodiment, the terminal 10D may also include resilient locking portions.

In the above first embodiment, the second terminal includes the guide portions. However, the second terminal may include no guide portion as another embodiment.

In the above first embodiment, the rotation direction (clockwise direction when viewed from above) of the upper terminal with respect to the lower terminal to lock the locking portions 13 and the resilient locking portions 17 is the same direction as the tightening direction (clockwise direction when viewed from above) of the bolt 30 with respect to the terminal 10B. However, these directions may be opposite directions.

Although the protecting portions are in the form of ribs extending in parallel to an assembly direction of the both terminal fittings in the above second embodiment, the protecting portions may be in the form of ribs extending in a direction intersecting the assembly direction of the both terminal fittings.

Although the resilient lock piece is cantilevered in the direction intersecting the assembly direction of the both terminal fittings in the above second embodiment, the resilient lock piece may be cantilevered in a direction parallel to the assembly direction of the both terminal fittings.

Although the lock portion is in the form of a projection and locked into the slit of the resilient lock piece in the above second embodiment, the lock portion may be in the form of a hole and a projection of the resilient lock piece may be locked into the hole-like lock portion.

Although the first terminal fitting assembled with the first sub-terminal assembled in advance is assembled with the second terminal fitting in the above second embodiment, the first terminal fitting may be singly assembled with the second terminal fitting.

Although the second terminal fitting assembled with the second sub-terminal assembled in advance is assembled with the first terminal fitting in the above second embodiment, the second terminal fitting may be singly assembled with the first terminal fitting.

LIST OF REFERENCE NUMERALS

1 . . . combination terminal
10 . . . first terminal module
10A . . . terminal
10B . . . terminal
10C . . . terminal
10D . . . terminal
11 . . . base plate portion
12 . . . guided portion
13 . . . locking portion (lock portion)
14 . . . guide portion
15 . . . crimping portion
16 . . . hooking portion
17 . . . resilient locking portion (lock portion)
18 . . . through hole
18C . . . through hole (cut portion)
19 . . . contact point receiving portion
21 . . . root portion
22 . . . body portion
23C . . . planar portion (second planar portion)
24 . . . locking hole
26 . . . contact point portion
28 . . . outer peripheral guide portion
30 . . . bolt
31 . . . head portion
32 . . . shaft portion
33 . . . screw head
34 . . . washer
40 . . . fixed member
41 . . . first hole
42 . . . second hole
201 . . . combination terminal
210 . . . first terminal module
211 . . . first terminal fitting (first terminal)
212 . . . first base plate portion
212A . . . first planar portion
213 . . . crimping portion
214 . . . first bolt hole
215 . . . first receiving portion
216 . . . retaining hole
217 . . . retaining projection
219 . . . first lock fitting portion
220 . . . first lock portion (lock portion)
221 . . . first lock supporting portion
222 . . . first resilient lock piece (lock portion)
223 . . . bent portion
224 . . . folded portion
225 . . . base end part
226 . . . extending end part
227 . . . slit
228 . . . first protecting portion
232 . . . first sub-terminal
233 . . . first plate-like base portion
234 . . . rotation stop portion
235 . . . first covering portion
240 . . . second terminal module
241 . . . second terminal fitting (second terminal)
242 . . . second base plate portion
242A . . . first cut portion
242B . . . second cut portion
243 . . . second bolt hole
244 . . . second covering portion
245 . . . second lock fitting portion
246 . . . second lock portion (lock portion)
248 . . . second resilient lock piece (lock portion)
248A . . . bent portion
248B . . . folded portion
248C . . . base end part
248D . . . extending end part
248E . . . slit
249 . . . second protecting portion
251 . . . second contact point portion
252 . . . second sub-terminal
253 . . . second plate-like base portion
254 . . . second receiving portion
260 . . . bolt
261 . . . head portion
262 . . . shaft portion
270 . . . fixed member
271 . . . first hole
272 . . . second hole

What is claimed is:

1. A combination terminal, comprising:

a first terminal to be fixed to a fixed member using a bolt; and a second terminal to be assembled with the first terminal, the first terminal and the second terminal including lock portions for locking the first terminal and the second terminal in an assembled state by being locked to each other, and the second terminal including a cut portion, a head portion of the bolt entering the cut portion in the assembled state of the first terminal and the second terminal.

2. The combination terminal of claim 1, wherein:

the lock portions are locked to each other by relatively rotating the first terminal and the second terminal, the second terminal includes a second base plate portion provided with the cut portion, and an annular second planar portion is provided around the cut portion in the second base plate portion.

3. The combination terminal of claim 1, wherein:

the first terminal includes a first base plate portion, the second terminal includes a second base plate portion provided with the cut portion, the first terminal and the second terminal are assembled with the first base plate portion and the second base plate portion stacked, the lock portions are locked to each other by relatively displacing the first terminal and the second terminal in a direction intersecting a stacking direction, and the first terminal includes a first planar portion to be exposed in the cut portion in the assembled state of the first terminal and the second terminal.

4. The combination terminal of claim 2, wherein a rotation direction of the second terminal with respect to the first terminal to lock the lock portions to each other is the same direction as a tightening direction of the bolt with respect to the first terminal.

* * * * *